United States Patent
Kojima

(10) Patent No.: US 9,461,903 B2
(45) Date of Patent: Oct. 4, 2016

(54) COMMUNICATION DEVICE, COMMUNICATION SYSTEM, AND COMMUNICATION METHOD

(71) Applicant: FUJITSU LIMITED, Kawasaki-shi, Kanagawa (JP)

(72) Inventor: Yuji Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 172 days.

(21) Appl. No.: 14/220,307

(22) Filed: Mar. 20, 2014

(65) Prior Publication Data

US 2014/0289313 A1 Sep. 25, 2014

(30) Foreign Application Priority Data

Mar. 21, 2013 (JP) ................. 2013-058797

(51) Int. Cl.
*G06F 15/16* (2006.01)
*H04L 12/26* (2006.01)
*H04L 12/24* (2006.01)

(52) U.S. Cl.
CPC ......... *H04L 43/0888* (2013.01); *H04L 41/509* (2013.01); *H04L 41/5019* (2013.01)

(58) Field of Classification Search
USPC ........ 709/203, 202, 238, 239, 240, 241, 244
See application file for complete search history.

(56) References Cited

U.S. PATENT DOCUMENTS

| | | |
|---|---|---|
| 4,967,345 A | 10/1990 | Clarke et al. |
| 5,526,414 A | 6/1996 | Bedard et al. |
| 6,115,752 A | 9/2000 | Chauhan |
| 6,128,279 A | 10/2000 | O'Neil et al. |
| 6,240,452 B1 | 5/2001 | Welch, Jr. et al. |
| 6,259,705 B1 | 7/2001 | Takahashi et al. |
| 6,321,271 B1 | 11/2001 | Kodialam et al. |
| 6,590,867 B1 | 7/2003 | Ash et al. |
| 6,760,314 B1 | 7/2004 | Iwata |
| 6,831,895 B1 | 12/2004 | Ji et al. |
| 6,859,842 B1 | 2/2005 | Nakamichi et al. |

(Continued)

FOREIGN PATENT DOCUMENTS

| | | |
|---|---|---|
| EP | 1 100 233 A2 | 5/2001 |
| JP | 2001-144804 A | 5/2001 |

(Continued)

OTHER PUBLICATIONS

Final Office Action issued in U.S. Appl. No. 11/098,045 dated Apr. 15, 2009.

(Continued)

*Primary Examiner* — Lan-Dai T Truong
(74) *Attorney, Agent, or Firm* — Arent Fox LLP

(57) ABSTRACT

A communication device, including: a processor configured to estimate each of a plurality of first throughputs for each of a plurality of first route patterns corresponding to each of combinations of a plurality of first routes used in parallel, coupling the communication device to a first content server, estimate each of a plurality of second throughputs for each of a plurality of second route patterns corresponding to each of combinations of a plurality of second routes used in parallel, coupling the communication device to a second content server, select one of the plurality of the first and second route patterns based on the estimated plurality of the first and second throughputs, acquire an identical content from the first content server or the second content server using the selected one of the plurality of the first and second route patterns, and transmit the acquired identical content to a terminal device.

8 Claims, 14 Drawing Sheets

(56) References Cited

U.S. PATENT DOCUMENTS

| | | |
|---|---|---|
| 7,079,493 B2 | 7/2006 | Nakamichi et al. |
| 7,120,125 B2 | 10/2006 | Kikuchi et al. |
| 7,185,104 B1 | 2/2007 | Thorup et al. |
| 2001/0019554 A1 | 9/2001 | Nomura et al. |
| 2001/0037401 A1 | 11/2001 | Soumiya et al. |
| 2002/0012318 A1 | 1/2002 | Moriya et al. |
| 2002/0051449 A1 | 5/2002 | Iwata |
| 2002/0053029 A1 | 5/2002 | Nakamura et al. |
| 2003/0055882 A1 | 3/2003 | Kawamura |
| 2003/0149755 A1 | 8/2003 | Sadot |
| 2004/0010617 A1 | 1/2004 | Akahane et al. |
| 2004/0172470 A1* | 9/2004 | Shiina .................... H04L 29/06 709/224 |
| 2014/0129667 A1* | 5/2014 | Ozawa .................... H04W 4/18 709/213 |

FOREIGN PATENT DOCUMENTS

| | | |
|---|---|---|
| JP | 2001-251343 A | 9/2001 |
| JP | 2001-352342 A | 12/2001 |
| JP | 2002-124976 A | 4/2002 |
| JP | 2002-141943 A | 5/2002 |
| JP | 2002-251383 A | 9/2002 |
| JP | 2002-252639 A | 9/2002 |
| JP | 2002-300185 A | 10/2002 |
| JP | 2002-374290 A | 12/2002 |
| JP | 2009-246875 A | 10/2009 |
| JP | 2012-049643 A | 3/2012 |

OTHER PUBLICATIONS

Final Office Action issued in U.S. Appl. No. 11/098,045 dated May 24, 2010.
International Search Report dated May 27, 2003.
Non-Final Office Action issued in U.S. Appl. No. 11/098,045 dated Aug. 19, 2008.
Non-Final Office Action issued in U.S. Appl. No. 11/098,045 dated Nov. 24, 2009.
Notice of Reasons for Rejection dated Dec. 16, 2008, from the corresponding Japanese Application (English translation).

* cited by examiner

COMMUNICATION DEVICE, COMMUNICATION SYSTEM, AND COMMUNICATION METHOD

CROSS-REFERENCE TO RELATED APPLICATION

This application is based upon and claims the benefit of priority of the prior Japanese Patent Application No. 2013-058797, filed on Mar. 21, 2013, the entire contents of which are incorporated herein by reference.

FIELD

The embodiments discussed herein are related to a communication device, a communication system, and a communication method for selecting a content server in the communication device.

BACKGROUND

Currently, a wireless communication system such as a portable telephone system and a wireless local area network (LAN) has been widely used. Further, a next-generation communication technique has been continuously discussed so as to further improve a communication speed and communication capacity in a mobile communication field. For example, in 3rd generation partnership project (3GPP) which is a standard-setting organization, standardization of a communication standard such as long term evolution (LTE) and LTE-advance (LTE-A) based on the LTE has been completed or examined.

In such wireless communication system, there is a case in which wireless communication in which a micro base station (or femtocell base station; femto BS. The micro base station may be referred to below as a femtocell base station) is used is performed.

A femtocell base station is capable of performing wireless communication with a registered user (or a registered terminal device) and has difficulty in wireless communication with users other than the registered user, for example. Femtocell base stations are installed in indoor or underground places in which communication radio waves are weaker than those in outdoor places, for example, and are capable of performing wireless communication with terminal devices in such places as well. Femtocell base stations employing the LTE communication standard have been started to be sold today.

In a case in which a femtocell base station is installed in a house or the like, the femtocell base station is coupled to a network of a mobile communication network provider which provides the femtocell base station, for example. The femtocell base station is capable of accessing a content server and the like, for example, by using the network of the mobile communication network provider so as to provide contents to subordinate terminals.

Further, in a case in which a femtocell base station is installed in a house or the like, the femtocell base station (or a home network including terminals) is coupled to a network of a provider which provides a connection service to Internet, for example. The femtocell base station is also capable of accessing a content server by using the network of the provider, for example.

Thus, the femtocell base station is coupled to a network of a mobile communication network provider and a network of a provider, for example, and is capable of accessing a content server and the like by using a plurality of routes. Which provider's network or which route the femtocell base station uses is determined in accordance with a destination internet protocol (IP) address of a transmission packet, for example. When a transmission destination IP address of an IP packet is address #1, for example, the femtocell base station selects route #1 and transmits the IP packet to a network of a provider. On the other hand, when a transmission destination IP address of an IP packet is address #2, for example, the femtocell base station selects route #2 and transmits the IP packet to a network of a mobile communication network provider.

Meanwhile, examples of a network for delivering contents such as a moving image and music via Internet include a contents delivery network.

A plurality of content servers are coupled to the contents delivery network and hold contents identical to each other, and the contents are delivered from a content server which is closest to a user, for example. Selection of a content server in the contents delivery network is performed in accordance with an IP address of a domain name server (DNS), for example. The DNS server is a server which replies an IP address corresponding to a uniform resource locator (URL) in response to a DNS query including the URL, for example.

For example, when a DNS server in the contents delivery network receives a DNS query from a DNS server of a certain network, the DNS server in the contents delivery network replies an IP address of content server #1, and when the DNS server in the contents delivery network receives a DNS query from a DNS server of another network, the DNS server in the contents delivery network replies an IP address of content server #2.

Meanwhile, there is a technique called link aggregation in a communication field. The link aggregation is a technique for performing communication by using one or a plurality of routes simultaneously, for example. A wider bandwidth is realized by the link aggregation, for example, being able to improve a throughput (or transmission capacity) of traffic flow.

The technique related to the link aggregation includes the following example. Namely, there is such technique that a communication terminal refers to a connection rule table including a priority order and communication fee for every access point, selects an access point to be coupled from a usable network, and establishes link aggregation so as to perform communication.

Japanese Laid-open Patent Publication No. 2009-246875 is an example of related art.

SUMMARY

According to an aspect of the invention, a communication device, includes a first communication interface configured to communicate with a first content server or a second content server, the first content server and the second content server being configured to deliver an identical content, a second communication interface configured to communicate with a terminal device, and a processor configured to estimate each of a plurality of first throughputs for each of a plurality of first route patterns, each of a plurality of first route patterns corresponding to each of combinations of a plurality of first routes used in parallel, the plurality of the first routes coupling the communication device to the first content server respectively, estimate each of a plurality of second throughputs for each of a plurality of second route patterns, each of a plurality of second route patterns corresponding to each of combinations of a plurality of second routes used in parallel, the plurality of the second routes coupling the communication device to the second content server respectively, select one of the plurality of the first and second route patterns based on the estimated plurality of the first and second throughputs, acquire the identical content from the first content server or the second content server using the selected one of the plurality of the first and second route patterns, and transmit the acquired identical content to the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
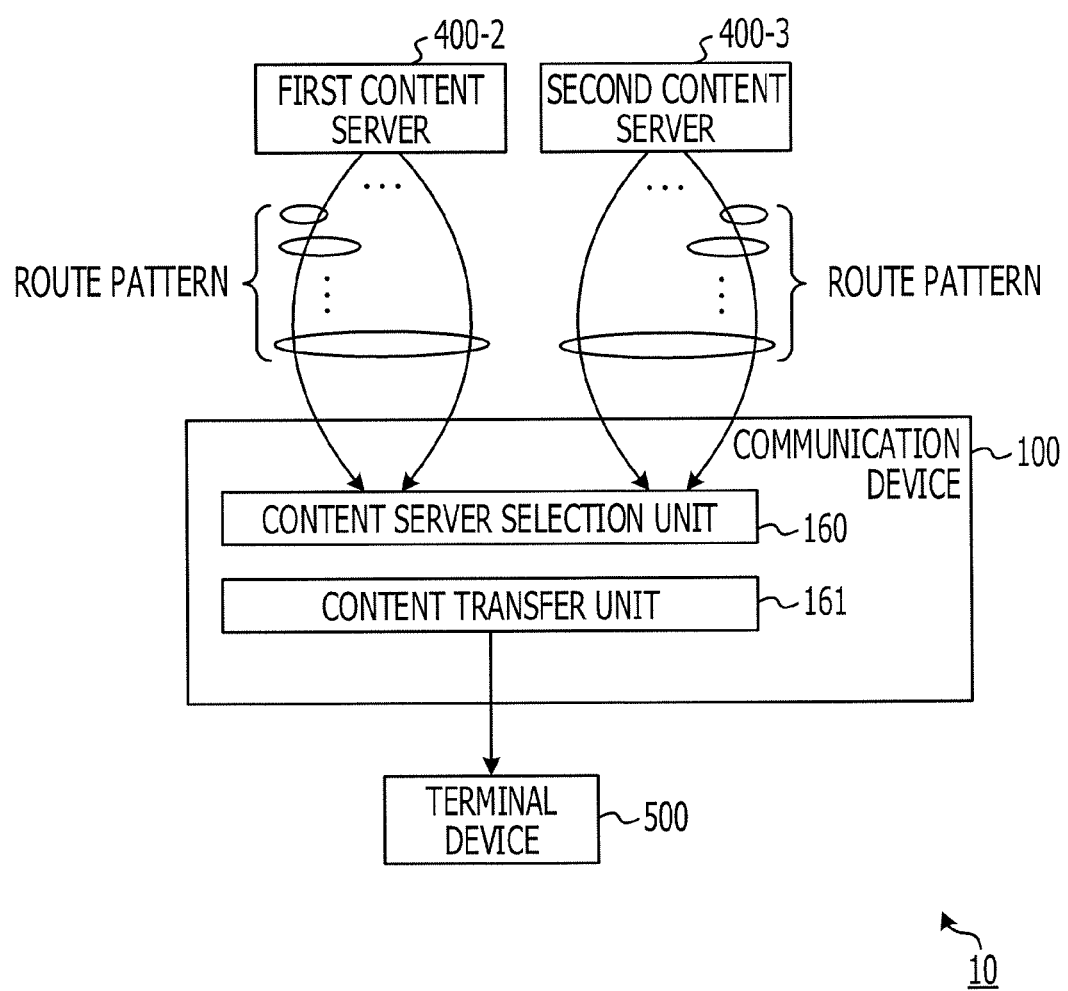
FIG. 1 illustrates a configuration example of a communication network system.

However, a femtocell base station determines which route the femtocell base station uses among a plurality of routes in accordance with a destination IP address of a transmission packet, for example, as described above. Therefore, when the femtocell base station performs communication with any content server by using the link aggregation, the femtocell base station has difficulty in selection of a content server which is coupled with the femtocell base station by a pattern of the link aggregation which exhibits a high throughput. That is, when the femtocell base station performs communication with any content server among a plurality of content servers by using the link aggregation, the femtocell base station has difficulty in selection of a content server in which a higher throughput is obtained compared to other content servers.

Further, an end-to-end throughput between a content server and a terminal is determined depending not only on a throughput in a wired zone between the content server and a femtocell base station but also on a throughput in a wireless zone between the femtocell base station and a terminal. Accordingly, even in a case of a pattern of the link aggregation of which a throughput in the wired zone is higher than that of other patterns, an end-to-end throughput may not become higher when a throughput in a wireless zone is lower than that in a wired zone.

Meanwhile, the femtocell base station selects a route in accordance with a destination IP address, for example. Therefore, it is difficult for the femtocell base station to select a content server which is coupled by a pattern exhibiting a low processing load of the base station among a plurality of link aggregation patterns in a wired zone in which a throughput equivalent to that in a wireless zone is obtained.

Further, the technique in which a communication terminal selects an access point by using a connection rule table is a technique in which the communication terminal selects an access point in the light of a priority order and communication fee of each access point, for example. Accordingly, a content server which is coupled by a pattern of the ling aggregation which exhibits a higher throughput than other patterns is not selected among a plurality of content servers, in this technique either.

Therefore, it is desirable to provide a communication device, a communication network system, and a method for selecting a content server that enable selection of a content server from which a higher throughput is obtained than other content servers in a case in which communication is performed by using link aggregation.

Further, it is desirable to provide a communication device, a communication network system, and a method for selecting a content server that enable that enable selection of a content server coupled by a pattern exhibiting a low processing load among patterns of link aggregation in which a throughput equivalent to a throughput in wireless communication is obtained.

Furthermore, it is desirable to provide a communication device, a communication network system, and a method for selecting a content server that realize improvement of a throughput between a content server and a terminal device.

Embodiments of the present disclosure are described below.

First Embodiment

A first embodiment is first described. FIG. 1 illustrates a configuration example of a communication network system 10 according to the first embodiment.

The communication network system 10 includes first and second content servers 400-2 and 400-3, a communication device 100, and a terminal device 500.

The first and second content servers 400-2 and 400-3 are capable of delivering identical contents. The first and second content servers 400-2 and 400-3 accumulate video data and audio data related to contents in a file format, for example.

The communication device 100 acquires a content from the first or second content server 400-2 or 400-3 and transmits the acquired content to the terminal device 500. The communication device 100 includes a content server selection unit 160 and a content transfer unit 161.

As illustrated in FIG. 1, here are a plurality of routes from the communication device 100 to the first content server 400-2. There are also a plurality of routes from the communication device 100 to the second content server 400-3.

Further, there are a plurality of route patterns which are identified by one route or a plurality of routes which are simultaneously used, as a plurality of routes from the communication device 100 to the first content server 400-2. There is also a plurality of route patterns which are identified by one route or a plurality of routes which are simultaneously used, as a plurality of routes from the communication device 100 to the second content server 400-3. A route pattern is a pattern with respect to one or a plurality of routes which constitute link aggregation, for example. The communication device 100 uses one or a plurality of routes which are simultaneously used so as to acquire a content from the first or second content server 400-2 or 400-3 by the technique of the link aggregation, for example.

The content server selection unit 160 selects the first or second content server 400-2 or 400-3 which is coupled with the communication device 100 by a route pattern of which a throughput is estimated to be highest among these route patterns.

The content transfer unit 161 acquires a content from the first or second content server 400-2 or 400-3 which is selected and transmits the acquired content to the terminal device 500.

Thus, in the first embodiment, the communication device 100 is capable of selecting the content server 400-2 or 400-3 which is coupled by a pattern of the link aggregation which exhibits a higher throughput than other patterns, between a plurality of content servers 400-2 and 400-3.

Further, the communication device 100 selects such content server 400-2 or 400-3 so as to use a route pattern exhibiting a high throughput. Thus, the communication device 100 is capable of improving a throughput between the content server 400-2 and the terminal device 500 and between the content server 400-3 and the terminal device 500, for example.

The communication device 100 is a base station device, for example. In this case, the communication device 100 is capable of performing wireless communication with the terminal device 500 and transmitting a content acquired from the first or second content server 400-2 or 400-3 to the terminal device 500 by wireless communication.

In this case, the communication device 100 measures a throughput of wireless communication between the communication device 100 and the terminal device 500 so as to select a route pattern using the smallest number of routes among route patterns of which throughputs are estimated to be higher than the measurement result. Then, the communication device 100 selects the first or second content server 400-2 or 400-3 which is coupled with the communication device 100 by a route pattern of which a throughput is estimated to be highest among these route patterns.

The communication device 100 selects a route pattern using the smallest number of routes among the route patterns of which throughputs are estimated to be higher than a throughput of wireless communication, so that the communication device 100 is capable of selecting a route pattern exhibiting a low processing load in the communication device 100.

Further, the communication device 100 selects a route pattern of which a throughput is estimated to be highest among such route patterns. Therefore, the communication device 100 is capable of selecting the first or second content server 400-2 or 400-3 which is coupled by a pattern exhibiting a lower processing load, among patterns of the link aggregation in which a throughput equivalent to a throughput of wireless communication is obtained.

Second Embodiment

A second embodiment is now described. A configuration example of a communication network system according to the second embodiment is first described.

<Configuration Example of Communication Network System 10>

Figure 2:
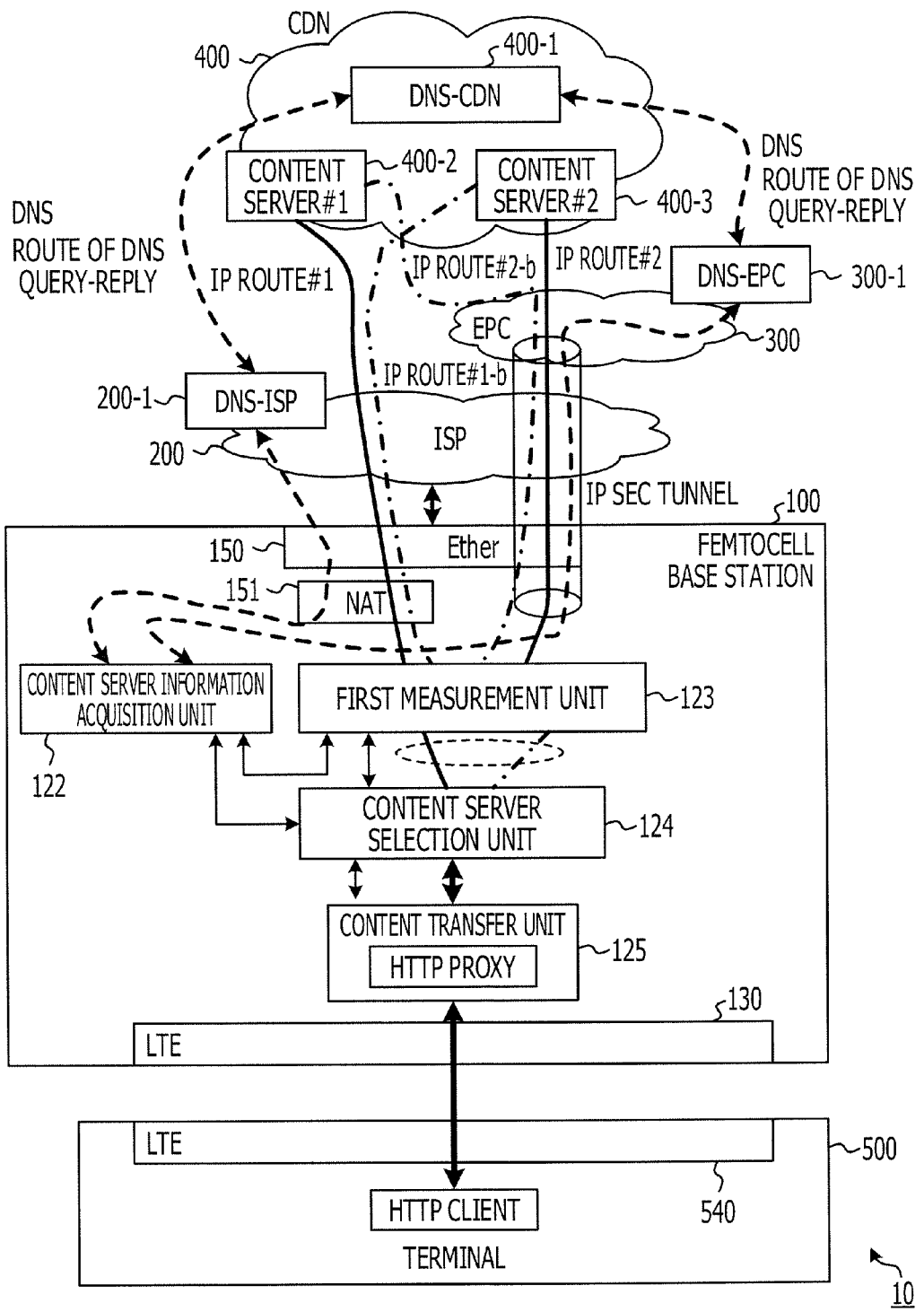
FIG. 2 illustrates a configuration example of a communication network system.

FIG. 2 illustrates a configuration example of a communication network system 10 according to the second embodiment.

The communication network system 10 includes a contents delivery network (may be referred to below as a CDN) 400 for delivering contents. Content servers 400-2 and 400-3 are coupled to the CDN 400 and contents are delivered from the content servers 400-2 and 400-3. Types of contents include moving images, music, and games, for example. Video data and audio data related to these contents are stored in the content servers 400-2 and 400-3 in a file format.

As illustrated in FIG. 2, the communication network system 10 includes a femtocell base station device (may be referred to below as a femtocell base station) 100, an internet service provider (ISP) 200, an evolved packet core (EPC) 300, the CDN 400, and a terminal device (may be referred to below as a terminal) 500. Here, the femtocell base station 100 and the terminal 500 constitute a home network, for example.

The femtocell base station 100 is a communication device, for example. The femtocell base station 100 performs wireless communication with the terminal 500 and also performs communication with the content servers 400-2 and 400-3 via the ISP 200 and the like. The femtocell base station 100 provides a service such as delivery of contents to a registered user (or registered terminal 500) but the femtocell base station 100 does not provide a service to a user other than the registered user. Details of the femtocell base station 100 will be described later.

The ISP 200 is a network of a provider which provides a service for coupling a home network to Internet, for example. To the ISP 200, a DNS-ISP 200-1 is coupled.

The DNS-ISP 200-1 is a DNS server which is coupled to the ISP 200, for example. When the DNS-ISP 200-1 receives a DNS query which is transmitted from the femtocell base station 100, the DNS-ISP 200-1 transmits the DNS query to a DNS-CDN 400-1. When the DNS-ISP 200-1 receives a DNS reply with respect to the DNS query from the DNS-CDN 400-1, the DNS-ISP 200-1 transmits the DNS reply to the femtocell base station 100. The DNS-ISP 200-1 receives the DNS reply with respect to the DNS query so as to acquire an IP address of the content server 400-2 or 400-3 corresponding to a URL.

The EPC 300 is a network of a mobile communication network provider which provides the femtocell base station 100, for example. A tunnel based on an IP security tunnel protocol is set between the EPC 300 and the femtocell base station 100. For example, a security GW is coupled to the EPC 300 and the security GW and the femtocell base station 100 perform processing such as capsulation of an IP packet and termination of the capsulated IP packet.

Further, a DNS-EPC 300-1 is coupled to the EPC 300 as a DNS server.

When the DNS-EPC 300-1 receives a DNS query which is transmitted from the femtocell base station 100, the DNS-EPC 300-1 transmits the DNS query to the DNS-CDN 400-1. When the DNS-EPC 300-1 receives a DNS reply with respect to the DNS query from the DNS-CDN 400-1, the DNS-EPC 300-1 transmits the DNS reply to the femtocell base station 100. The DNS-EPC 300-1 receives the DNS reply with respect to the DNS query so as to acquire an IP address of the content server 400-2 or 400-3 corresponding to a URL.

The CDN 400 is a network of a content delivery provider, for example. To the CDN 400, the DNS-CDN 400-1 and the content servers 400-2 and 400-3 are coupled.

The DNS-CDN 400-1 is a DNS server in the CDN 400, for example. The DNS-CDN 400-1 receives a DNS query which is transmitted from the DNS-ISP 200-1 and the DNS-EPC 300-1 and replies an IP address of one of the content servers 400-2 and 400-3. The DNS-CDN 400-1 replies an IP address of the content server 400-2 or 400-3 which is closer to a user and usually replies an IP address of one of the content servers 400-2 and 400-3 in accordance with a DNS server which transmits the DNS query.

For example, the DNS-CDN 400-1 replies an IP address of the content server 400-2 with respect to a DNS query which is transmitted from the DNS-ISP 200-1. Further, the DNS-CDN 400-1 replies an IP address of the content server 400-3 with respect to a DNS query which is transmitted from the DNS-EPC 300-1.

Both of the content servers 400-2 and 400-3 store identical contents and both of the content servers 400-2 and 400-3 are capable of delivering contents. The content servers 400-2 and 400-3 include a large-capacity memory such as a hard disk drive, for example, and stores contents in the memory.

The terminal 500 is a communication device such as a feature phone and a smart phone. The terminal 500 includes an LTE interface 540 and performs wireless communication based on a communication standard of the LTE. Here, the terminal 500 is registered as a wirelessly-communicable terminal in the femtocell base station 100 and the terminal 500 is capable of accessing the femtocell base station 100 in a communicable range (or a cell range) of the femtocell base station 100 so as to receive a service of delivery of contents and the like.

In the network configuration example illustrated in FIG. 2, there are a plurality of routes from the femtocell base station 100 to the content servers 400-2 and 400-3. For example, routes to the content server 400-2 include IP route #1 which goes through the ISP 200 and IP route #2-b which goes through the ISP 200 and the EPC 300. Further, routes to the content server 400-3 include IP route #1-b which goes through the ISP 200 and IP route #2 which goes through the ISP 200 and the EPC 300.

The content server 400-2 is capable of transmitting identical contents by using both of the IP route #1 and the IP route #2-b with the technique of the link aggregation, for example. Further, the content server 400-3 is capable of transmitting identical contents by using both of the IP route #2 and the IP route #1-b with the technique of the link aggregation.

Alternatively, the content server 400-2 is capable of transmitting contents by using the IP route #1 or the IP route #2-b with the technique of the link aggregation. Further, the content server 400-3 is also capable of transmitting contents by using the IP route #2 or the IP route #1-b with the technique of the link aggregation.

The link aggregation represents a technique for performing communication by using one or a plurality of routes (or lines), for example. Further, a pattern (or a route pattern) of the link aggregation represents a combination with respect to one or a plurality of IP routes which constitute the link aggregation, for example. There are three patterns which are the IP route #1+the IP route #2-b, the IP route #1, and the IP route #2-b as patterns of the link aggregation in the content server 400-2, for example.

<Femtocell Base Station 100>

A configuration example of the femtocell base station 100 is now described. As illustrated in FIG. 2, the femtocell base station 100 includes a content server information acquisition unit 122, a first measurement unit 123, a content server selection unit 124, a content transfer unit 125, an LTE interface 130, an Ethernet® interface ("Ether" in FIG. 2) 150, and a network address translation unit (NAT) 151.

Here, the content server selection unit 124 corresponds to the content server selection unit 160 in the first embodiment, for example. Further, the content transfer unit 125 corresponds to the content transfer unit 161 in the first embodiment, for example.

The content server information acquisition unit 122 transmits a DNS query to the DNS-ISP 200-1 and the DNS-EPC 300-1 and receives a DNS reply from the DNS-ISP 200-1 and the DNS-EPC 300-1. The content server information acquisition unit 122 receives a DNS reply so as to acquire IP addresses of the content servers 400-2 and 400-3 which correspond to a URL which is inquired by the DNS query. The content server information acquisition unit 122 outputs the acquired IP addresses of the content servers 400-2 and 400-3 to the first measurement unit 123.

The first measurement unit 123 measures delay time or a throughput related to an IP route leading to the content servers 400-2 and 400-3 on the basis of the IP addresses which are acquired by the content server information acquisition unit 122. Details of the measurement method will be described later.

The content server selection unit 124 selects the content server 400-2 or 400-3 which is coupled with the femtocell base station 100 by a pattern of which a throughput is estimated to be highest among patterns of the link aggregation which are identified by one IP route or a combination of a plurality of IP routes, on the basis of the measurement result of the first measurement unit 123. Details of the selection method will be described later. The content server selection unit 124 outputs the selection result to the content transfer unit 125.

The content transfer unit 125 acquires a content from the selected content server 400-2 or 400-3 by using the selected pattern of the link aggregation.

The acquisition of a content is performed as described below, for example. Namely, the content transfer unit 125 transmits a content acquisition request to the selected content server 400-2 or 400-3 by an IP route of the selected pattern of the link aggregation. The content server 400-2 or 400-3 transmits a content to a transmission source which has transmitted the content acquisition request (for example, the femtocell base station 100), in response to the content acquisition request. Accordingly, the content transfer unit 125 is capable of acquiring a content from the selected content server 400-2 or 400-3 by using the selected pattern of the link aggregation.

Here, the content transfer unit 125 and the like hold an IP address belonging to the ISP 200 and an IP address belonging to the EPC 300, for example. Accordingly, the femtocell base station 100 is capable of transmitting a content acquisition request to the ISP 200 and is capable of transmitting a content acquisition request to the EPC 300 by passing through the ISP 200, for example.

Further, the content transfer unit 125 has a hyper text transfer protocol (HTTP) proxy function. The content transfer unit 125 acquires contents from the content servers 400-2 and 400-3 by using a communication protocol based on the HTTP. On the other hand, the terminal 500 has a HTTP client function, and the content transfer unit 125 transmits contents acquired by using the HTTP to the terminal 500.

The LTE interface 130 is an interface for performing wireless communication based on the LTE with the terminal 500, for example. For example, the LTE interface 130 receives a content which is outputted from the content transfer unit 125 and performs error correction coding processing, modulation processing, frequency conversion processing, and the like to convert the content into a wireless signal and transmit the wireless signal to the terminal 500. Further, the LTE interface 130 receives a wireless signal which is transmitted from the terminal 500 and performs frequency conversion processing, demodulation processing, error correction decoding processing, and the like so as to extract data and the like and output the data and the like to the content transfer unit 125. The LTE interface 130 may include an error correction coding circuit, a modulation circuit, an analogue to digital (A/D) circuit, and the like so as to perform such error correction coding processing, modulation processing, and the like.

The Ethernet® interface 150 serves as an interface between the femtocell base station 100 and the ISP 200, for example. For example, the Ethernet® interface 150 receives data and the like which are outputted from the first measurement unit 123 and the like and generates an IP packet, in which the data is included in a payload region, so as to transmit the IP packet to the ISP 200. Further, the Ethernet® interface 150 receives an IP packet which is transmitted from the ISP 200 and extracts data and the like from the payload region so as to output the data and the like to the first measurement unit 123 and the like, for example.

The NAT 151 converts an IP address for the EPC 300 which is included in the IP packet into an IP address for the ISP 200 so as to output the converted IP address to the Ethernet® interface 150. For example, when an IP address for the EPC 300 is assigned to the LTE interface 540 of the terminal 500 and the femtocell base station 100 uses the IP route #1 and the IP route #1-b, the NAT 151 converts the IP address for the EPC 300 into an IP address for the ISP 200. The Ethernet® interface 150 receives notification of the converted IP address and transmits an IP packet to the ISP 200.

The terminal 500 includes the LTE interface 540. The LTE interface 540 is an interface for performing wireless communication based on the LTE with, for example, the femtocell base station 100. For example, the LTE interface 540 converts data and the like into a wireless signal to transmit the wireless signal to the femtocell base station 100 or receives a wireless signal which is transmitted from the femtocell base station 100 to extract data and the like from the wireless signal. The LTE interface 540 may include an error correction coding circuit, a modulation circuit, a frequency conversion circuit, and the like so as to perform such conversion.

Further, the terminal 500 has the HTTP client function and acquires contents from the content servers 400-2 and 400-3 via the HTTP proxy of the content transfer unit 125 by the HTTP.

Figure 3:
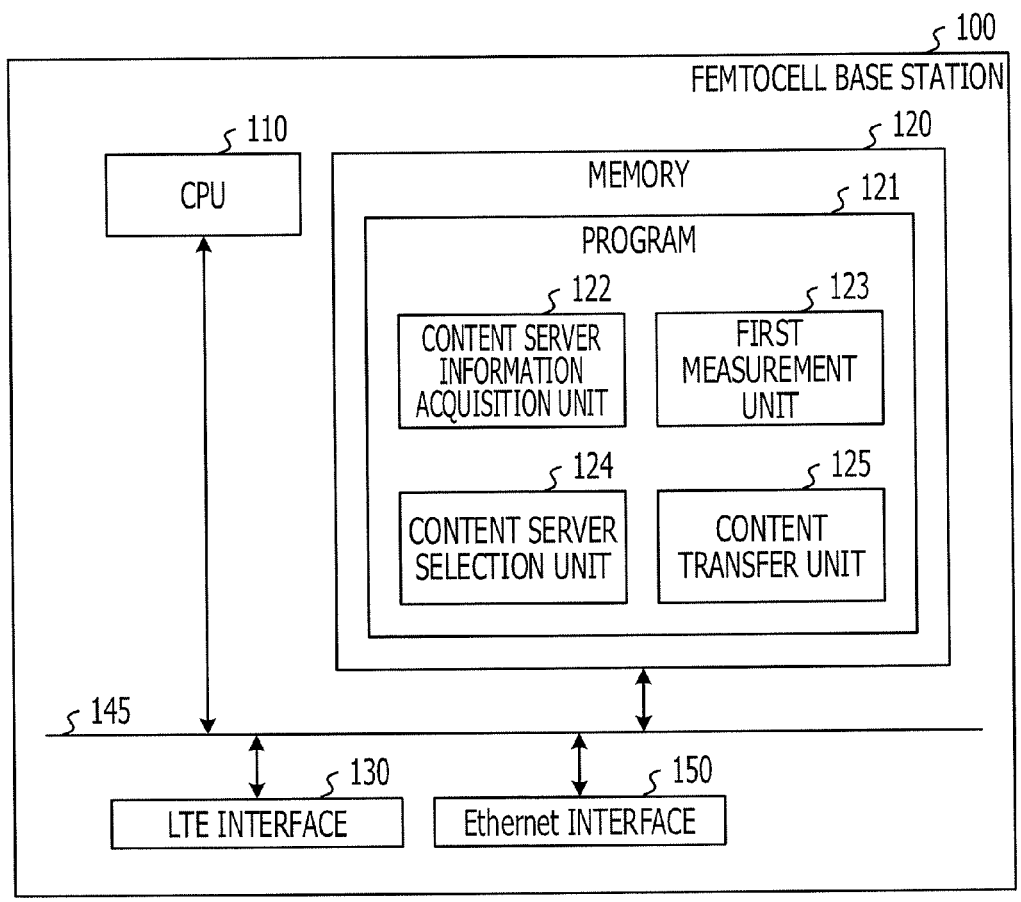
FIG. 3 illustrates a configuration example of a femtocell base station.

FIG. 3 illustrates a configuration example of hardware of the femtocell base station 100. The femtocell base station 100 includes a central processing unit (CPU) 110, a memory 120, the LTE interface 130, and the Ethernet® interface 150 and the CPU 110, the memory 120, the LTE interface 130, and the Ethernet® interface 150 are mutually coupled via a bus 145.

A program 121 is stored in the memory 120. The CPU 110 reads and executes the program 121 so as to realize respective functions of the content server information acquisition unit 122, the first measurement unit 123, the content server selection unit 124, and the content transfer unit 125. Accordingly, the content server information acquisition unit 122, the first measurement unit 123, the content server selection unit 124, and the content transfer unit 125 correspond to the CPU 110, for example.

<Configuration Examples of Other Devices>

Configuration examples of a DNS server of the DNS-ISP 200-1 and the like, the content servers 400-2 and 400-3, and the terminal 500 are now described.

Figure 4:
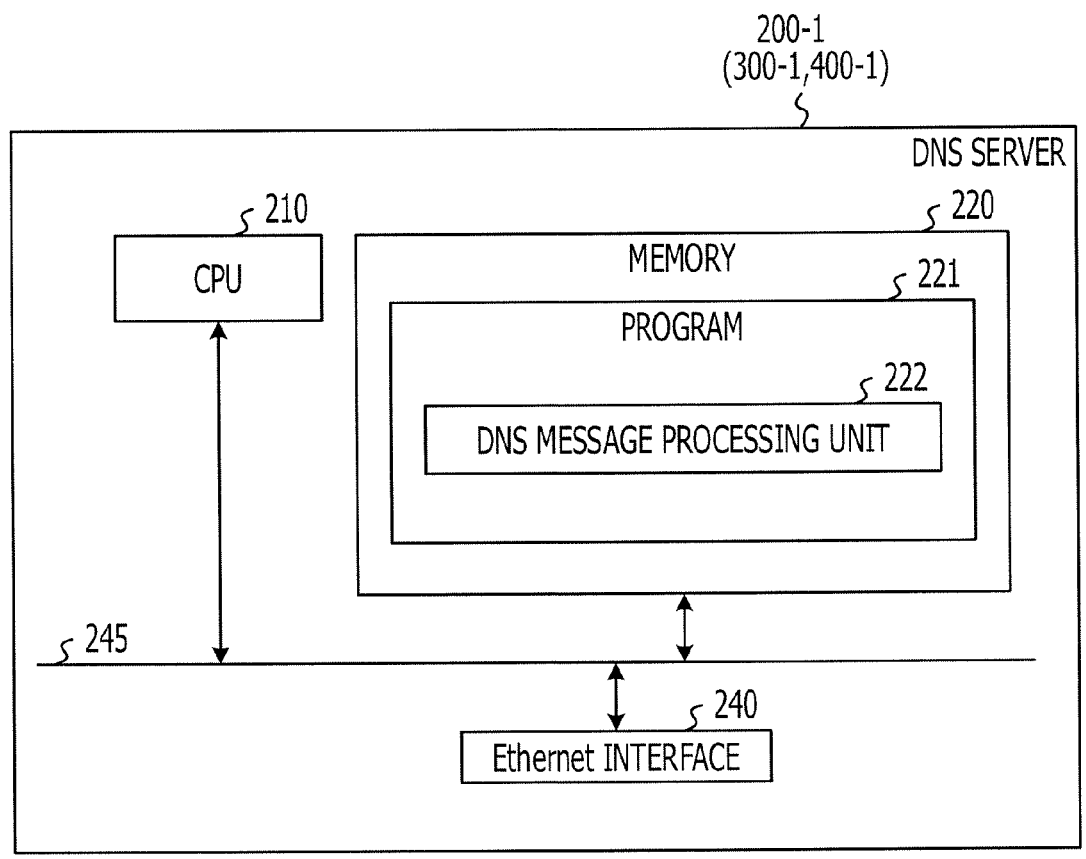
FIG. 4 illustrates a configuration example of a DNS server.

FIG. 4 illustrates a configuration example of hardware of the DNS-ISP 200-1. Here, respective configurations of the DNS-ISP 200-1, the DNS-EPC 300-1, and the DNS-CDN 400-1 are identical to each other, so that description given here is related to the DNS-ISP 200-1 unless any notification is especially provided.

The DNS-ISP 200-1 includes a CPU 210, a memory 220, and an Ethernet® interface 240 and the CPU 210, the memory 220, and the Ethernet® interface 240 are mutually coupled via a bus 245. A program 221 is stored in the memory 220. The CPU 210 reads and executes the program 221 so as to realize a function of a DNS message processing unit 222. The DNS message processing unit 222 corresponds to the CPU 210, for example.

The DNS message processing unit 222 of the DNS-ISP 200-1 and the DNS-EPC 300-1 receives a DNS query which is transmitted from the femtocell base station 100 via the Ethernet® interface 240. Then, the DNS message processing unit 222 of the DNS-ISP 200-1 and the DNS-EPC 300-1 transmits the received DNS query to the DNS-CDN 400-1 via the Ethernet® interface 240.

Further, the DNS message processing unit 222 of the DNS-ISP 200-1 and the DNS-EPC 300-1 receives a DNS reply which is transmitted from the DNS-CDN 400-1 via the Ethernet® interface 240. Then, the DNS message processing unit 222 of the DNS-ISP 200-1 and the DNS-EPC 300-1 transfers the DNS reply to a device of a transmission source which has transmitted the DNS query (for example, the femtocell base station 100) via the Ethernet® interface 240.

On the other hand, the DNS message processing unit 222 of the DNS-CDN 400-1 receives a DNS query via the Ethernet® interface 240. Then, the DNS message processing unit 222 of the DNS-CDN 400-1 replies an IP address of the optimum content server 400-2 or 400-3 in accordance with a network to which a DNS server which has transmitted the DNS query belongs. For example, the DNS message processing unit 222 of the DNS-CDN 400-1 replies an IP address of the content server 400-2 in response to a DNS query which is transmitted from the DNS-ISP 200-1. Further, the DNS message processing unit 222 replies an IP address of the content server 400-3 in response to a DNS query which is transmitted from the DNS-EPC 300-1. The DNS-CDN 400-1 transmits a reply as a DNS reply in reply of an IP address.

Figure 5:
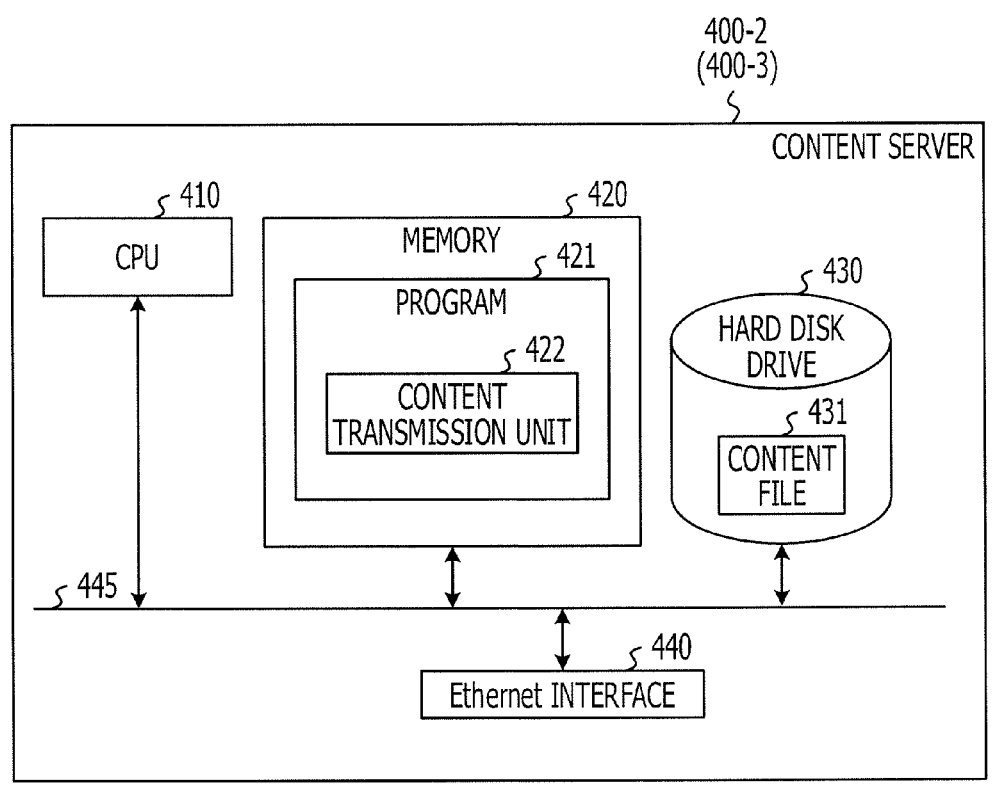
FIG. 5 illustrates a configuration example of a content server.

FIG. 5 illustrates a configuration example of hardware of the content servers 400-2 and 400-3. The content servers 400-2 and 400-3 have the same configuration as each other, so that the content server 400-2 is described as an example.

The content server 400-2 includes a CPU 410, a memory 420, a hard disk drive 430, and an Ethernet® interface 440 and the CPU 410, the memory 420, the hard disk drive 430, and the Ethernet® interface 440 are mutually coupled via a bus 445.

A program 421 is stored in the memory 420. The CPU 410 reads and executes the program 421 so as to realize a function of a content transmission unit 422. The content transmission unit 422 corresponds to the CPU 410, for example.

The content transmission unit 422 reads a content file 431 which is stored in the hard disk drive 430 and transmits a content by using an IP route via the Ethernet® interface 440. For example, when the content transmission unit 422 receives a content request, the content transmission unit 422 transmits a content to a transmission source of the content request.

Figure 6:
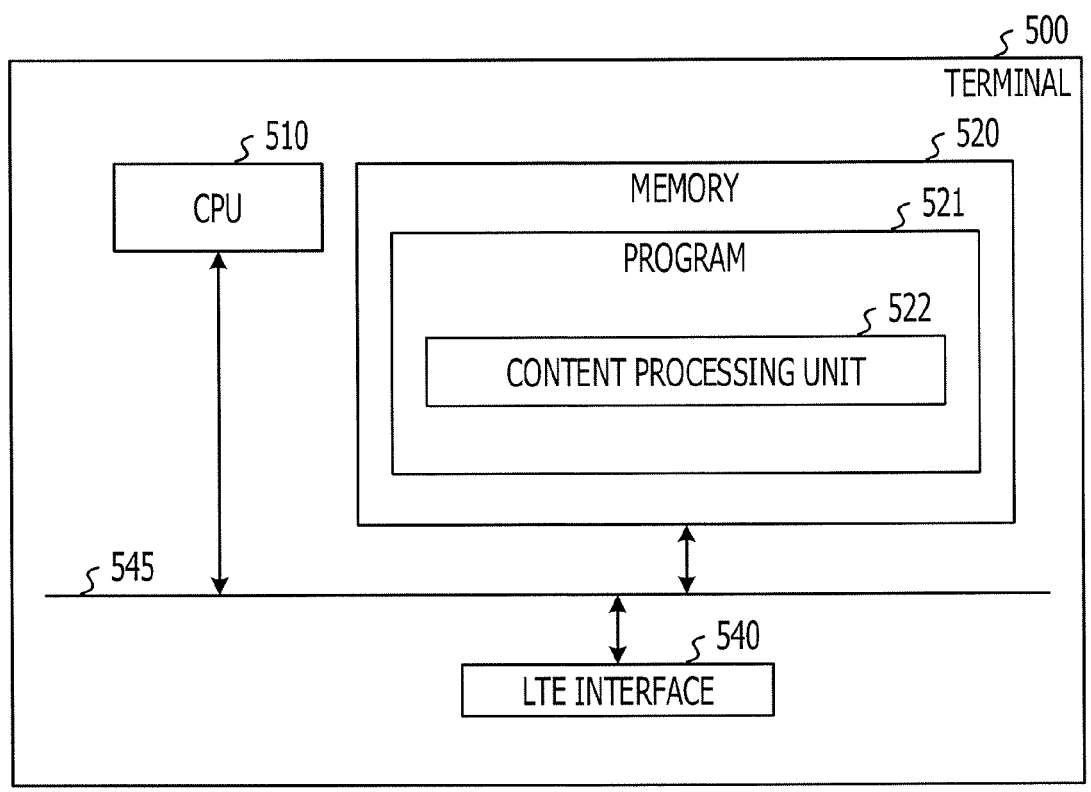
FIG. 6 illustrates a configuration example of a terminal.

FIG. 6 illustrates a configuration example of hardware of the terminal 500. The terminal 500 includes a CPU 510, a memory 520, and an LTE interface 540 and the CPU 510, the memory 520, and the LTE interface 540 are mutually coupled via a bus 545.

A program 521 is stored in the memory 520. The CPU 510 reads and executes the program 521 so as to realize a function of a content processing unit 522. The content processing unit 522 corresponds to the CPU 510, for example.

The content processing unit 522 has the HTTP client function, for example, and receives contents which are delivered from the content servers 400-2 and 400-3, by using the HTTP client function. Further, the content processing unit 522 performs compression-expansion processing with respect to received contents, for example, so as to allow a monitor screen to display a moving image related to the contents and allow a microphone to output sounds.

<Operation Example>

Figure 7:
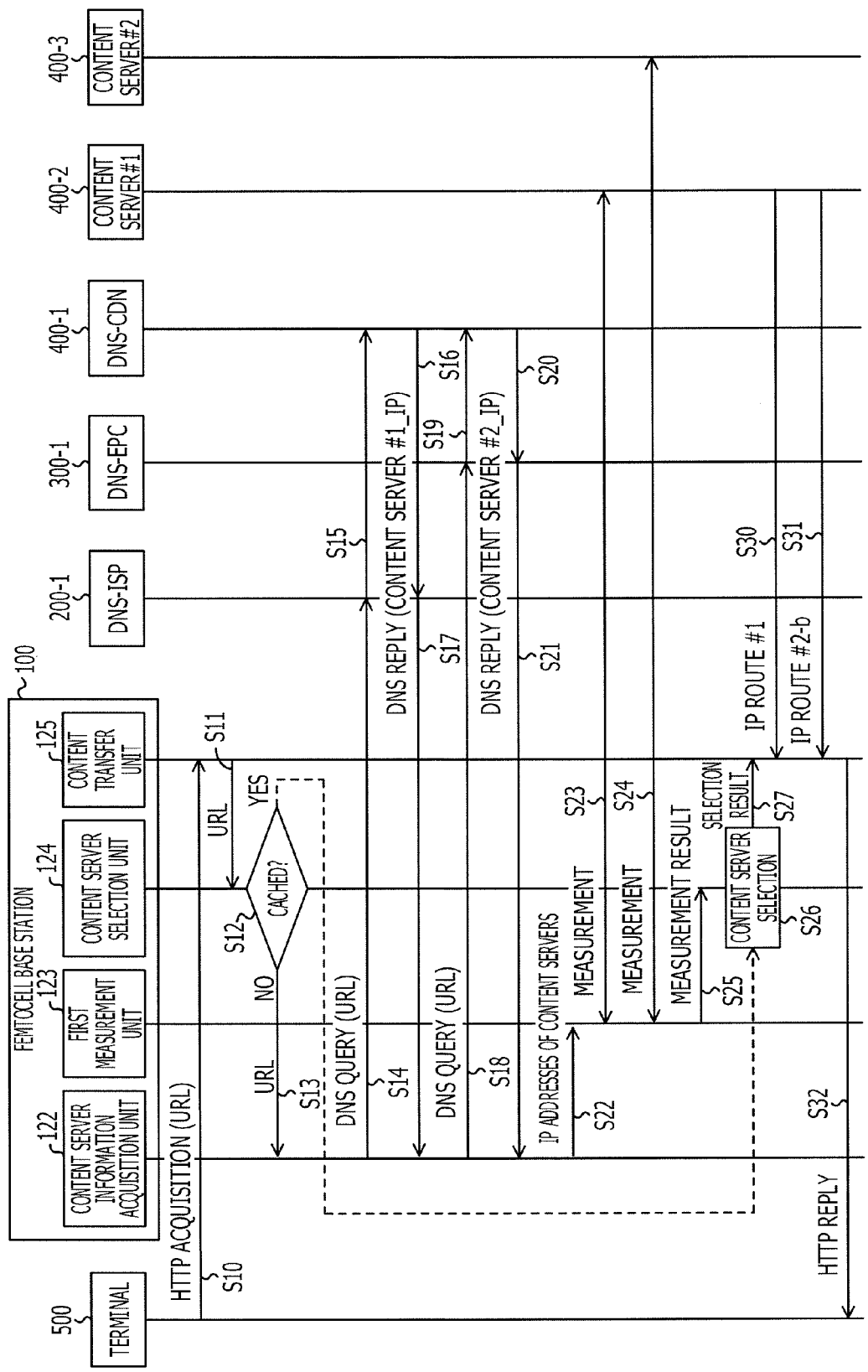
FIG. 7 is a sequence diagram illustrating an operation example in the communication network system.
Figure 8:
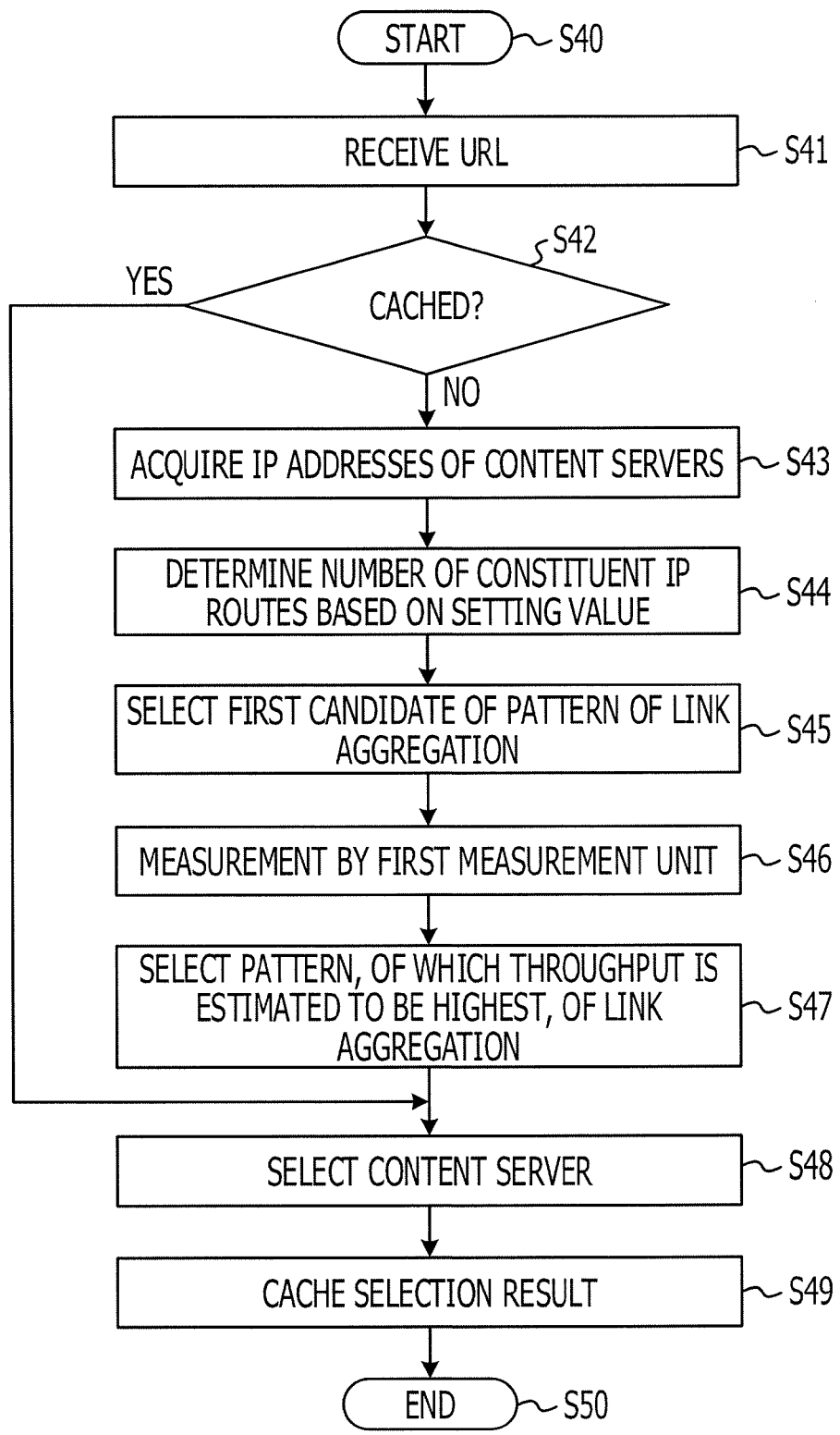
FIG. 8 is a flowchart illustrating an example of content server selection processing.

An operation example in the second embodiment is now described. FIG. 7 illustrates a sequence example in the communication network system 10, and FIG. 8 illustrates an example of a flowchart related to content server selection processing.

As illustrated in FIG. 7, the terminal 500 transmits a HTTP acquisition message to the femtocell base station 100 (S10). The HTTP acquisition message includes URLs of the content servers 400-2 and 400-3. The terminal 500 transmits the HTTP acquisition message so as to request delivery of contents, for example.

When the content transfer unit 125 of the femtocell base station 100 receives the HTTP acquisition message, the content transfer unit 125 extracts the URLs from the HTTP acquisition message and outputs the URLs to the content server selection unit 124 (S11).

Subsequently, the content server selection unit 124 searches a cache table which is held by the content server selection unit 124, so as to confirm whether or not selection results of the contents servers 400-2 and 400-3 corresponding to the received URLs are stored (S12). Details of the cache table will be described later.

When the selection results corresponding to the URLs are stored in the cache table (Yes in S12), the content server selection unit 124 selects one content server 400-2 or 400-3 by using the selection results (S26).

On the other hand, when the selection results corresponding to the URLs are not stored in the cache table (No in S12), the content server selection unit 124 outputs the URLs to the content server information acquisition unit 122 (S13).

Subsequently, the content server information acquisition unit 122 transmits a DNS query to a DNS server of a network to which the femtocell base station 100 is coupled (S14, S18). In the example of FIG. 7, the content server information acquisition unit 122 transmits a DNS query to the DNS-ISP 200-1 and the DNS-EPC 300-1.

When the DNS-ISP 200-1 receives the DNS query, the DNS-ISP 200-1 transmits the received DNS query to the DNS-CDN 400-1 which is a higher-order DNS server (S15).

When the DNS-CDN 400-1 receives the DNS query, the DNS-CDN 400-1 transmits an IP address of the content server 400-2 (content server #1_IP) as a DNS reply to the DNS-ISP 200-1 which is a transmission source which has transmitted the DNS query (S16).

When the DNS-ISP 200-1 receives the DNS reply, the DNS-ISP 200-1 transmits the DNS reply to the femtocell base station 100 which has transmitted the DNS query (S17). The content server information acquisition unit 122 receives the DNS reply and acquires an IP address of the content server 400-2 corresponding to the URL, for example.

Further, when the DNS-EPC 300-1 receives the DNS query, the DNS-EPC 300-1 transmits the received DNS query to the DNS-CDN 400-1 which is a higher-order server (S19).

When the DNS-CDN 400-1 receives the DNS query, the DNS-CDN 400-1 transmits an IP address of the content server 400-3 (content server #2_IP) as a DNS reply to the DNS-EPC 300-1 which is a transmission source which has transmitted the DNS query (S20).

When the DNS-EPC 300-1 receives the DNS reply, the DNS-EPC 300-1 transmits the DNS reply to the femtocell base station 100 which has transmitted the DNS query (S21). The content server information acquisition unit 122 receives the DNS reply and acquires an IP address of the content server 400-3 corresponding to the URL, for example.

Subsequently, the content server information acquisition unit 122 outputs the acquired IP addresses of the content servers 400-2 and 400-3 to the first measurement unit 123 (S22).

Then, the first measurement unit 123 measures delay time or a throughput related to an IP route leading to the content server 400-2 (S23). Further, the first measurement unit 123 measures delay time or a throughput related to an IP route leading to the content server 400-3 (S24). Details of the measurement method of delay time and a throughput will be described later.

Subsequently, the first measurement unit 123 outputs a measurement result to the content server selection unit 124 (S25).

Then, the content server selection unit 124 selects the content server 400-2 or 400-3 which is coupled to the femtocell base station 100 by a pattern of the link aggregation in which it is estimated that the highest throughput is obtained, on the basis of the measurement result of the first measurement unit 123 (S26). Details of the selection method will be described later.

Hereinafter, description is given on the assumption that the content server 400-2 which is coupled by a pattern of the link aggregation in which the IP route #1 and the IP route #2-b (for example, FIG. 2) are simultaneously used is selected.

Subsequently, the content server selection unit 124 outputs the selection result to the content transfer unit 125 (S27).

Then, the content transfer unit 125 acquires a content from the content server 400-2 which is coupled by the pattern by using the pattern of the link aggregation in which the IP route #1 and the IP route #2-b are simultaneously used (S30, S31).

For example, image data and audio data in the content are stored in the content server 400-2 in a file format, and the content server 400-2 transmits data stored in a certain region in the file (from the 1st byte to the 100th byte, for example)

via the IP route #1 and transmits data stored in another region in the same file (from the 101st byte to the 200th byte, for example) via the IP route #2-b simultaneously. In this case, the content transfer unit 125 combines data, which are received via the two routes, in the content (combines from the 1st byte to the 200th byte, for example) so as to obtain a single content.

Alternatively, the content server 400-2 may sort data stored in a certain region in the file to IP packet #1 and data stored in another region in the same file to IP packet #2 so as to transmit the IP packets #1 and #2 to the IP routes #1 and #2-b respectively.

Subsequently, the content transfer unit 125 transmits the acquired content to the terminal 500 as a HTTP reply (S32). For example, the content transfer unit 125 transmits certain number of bytes, such as several bytes from the head of a content acquired from the content server 400-2, to the terminal 500 in sequence.

Figure 9:
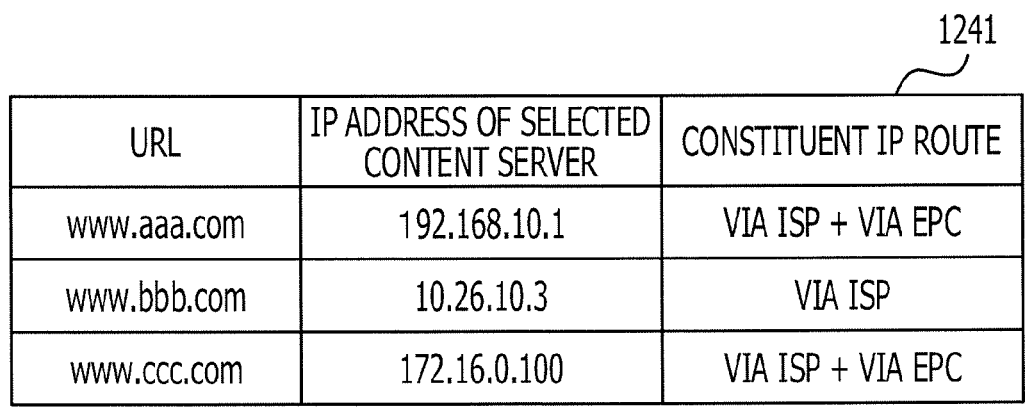
FIG. 9 illustrates a configuration example of a cache table.

FIG. 8 is a flowchart illustrating an example of content server selection processing, and FIG. 9 illustrates an example of a cache table. Details of a cache table, the measurement method performed by the first measurement unit 123, details of content server selection performed by the content server selection unit 124, and the like are described below with reference to FIGS. 8 and 9.

First, when the femtocell base station 100 starts processing (S40), the content server selection unit 124 receives a URL from the content transfer unit 125 (S41).

Then, the content server selection unit 124 confirms whether or not a selection result of the content server 400-2 or 400-3 corresponding to the received URL is cached in a cache table 1241 (S42).

FIG. 9 illustrates an example of the cache table 1241. The cache table 1241 is a table which is held by the content server selection unit 124, for example, and includes items which are "URL", "IP address of selected content server", and "constituent IP route".

In the item of "URL", part of a URL which is transmitted by the terminal 500 is stored. For example, when the terminal 500 transmits "http://www.aaa.com/aaa1/aaa2.html", "www.aaa.com" which is part of "http://www.aaa.com/aaa1/aaa2.html" is stored. When the terminal 500 transmits "http://www.aaa.com/aaa3/aaa4.html" in the next time, the content server selection unit 124 determines that "http://www.aaa.com/aaa3/aaa4.html" is cached because "www.aaa.com" is duplicated. A range to be stored in a region of "URL" may be determined by setting of the femtocell base station 100, for example.

In the item of "IP address of selected content server", IP addresses of the content servers 400-2 and 400-3 which have been selected thus far by the content server selection unit 124 are stored with respect to the URL. The example of FIG. 9 illustrates that the content server 400-2 (or the content server 400-3) having an IP address of "192.168.10.1" is selected with respect to "www.aaa.com".

In the item of "constituent IP route", IP routes which are used when the femtocell base station 100 acquires contents from the content servers 400-2 and 400-3 are stored. In the example of FIG. 9, "via ISP+via EPC" is stored, which represents that an IP route going through the ISP 200 (the IP route #1, for example) and an IP route going through the EPC 300 (the IP route #2-b, for example) are used. Further, in the example of FIG. 9, "via ISP" is stored, which represents that a route going through the ISP 200 (the route #1, for example) is used.

Referring back to FIG. 8, when a "URL" corresponding to the received URL is stored in the cache table 1241 (Yes in S42), the content server selection unit 124 selects the content server 400-2 or 400-3 which is stored in the cache table 1241 (S48). For example, the content server selection unit 124 acquires IP addresses of the content servers 400-2 and 400-3 from "IP address of selected content server" corresponding to the URL so as to select the content server 400-2 or 400-3.

Thus, the femtocell base station 100 uses selection results (for example, IP addresses of the content servers 400-2 and 400-3 and constituent IP routes) which are stored in the cache table 1241 (S42), being able to perform processing at higher speed than a case in which selection results are not used.

On the other hand, when a corresponding "URL" is not stored in the cache table 1241 (No in S42), the content server selection unit 124 outputs the URL to the content server information acquisition unit 122. Then, the content server information acquisition unit 122 transmits a DNS query to the DNS server so as to acquire IP addresses of the content servers 400-2 and 400-3 (S43). The content server information acquisition unit 122 outputs the acquired IP addresses to the first measurement unit 123.

Subsequently, the first measurement unit 123 determines the number of constituent IP routes based on a setting value (S44). The number of constituent IP routes represents the number of IP routes which constitute a pattern of the link aggregation. In a case of a pattern using the IP route #1 and the IP route #2-b as a pattern of the link aggregation, the number of constituent IP routes is "2". Further, in a case of a pattern using the IP route #1, the number of constituent IP routes is "1".

Due to the limitation of the device performance of the femtocell base station 100, the number of constituent IP routes which is up to "2" may be employed due to the link aggregation, but a processing load may exceed a predetermined threshold value in a case of the number of constituent IP routes which is "3" or more. Alternatively, there is a case in which it is favorable to set the number of constituent IP routes to "1" in initial shipping of the femtocell base station 100 and increase the number of constituent IP routes to "2" or more in accordance with addition of functions.

Therefore, in the femtocell base station 100, the maximum value of the number of constituent IP routes may be set by a setting value in the light of a processing load and addition of functions. For example, a user of the femtocell base station 100 operates an operation button or the like of the femtocell base station 100, being able to set a setting value.

Subsequently, the first measurement unit 123 examines patterns of the link aggregation of which the number of constituent IP routes is equal to or lower than the determined number of constituent IP routes, so as to select the first candidate (S45). For example, in the network configuration example illustrated in FIG. 2, when the number of constituent IP routes is determined as "2", the following patterns are selected as the first candidate. •First candidate #21: IP route #1+IP route #2-b leading to the content server 400-2, •First candidate #22: IP route #2+IP route #1-b leading to the content server 400-3, •First candidate #23: IP route #1 leading to the content server 400-2, •First candidate #24: IP route #2-b leading to the content server 400-2, •First candidate #25: IP route #2 leading to the content server 400-3, •First candidate #26: IP route #1-b leading to the content server 400-3

Further, when the number of constituent IP routes is "1", the following patterns are selected as the first candidate. •First candidate #11: IP route #1 leading to the content server 400-2, •First candidate #12: IP route #2-b leading to the content server 400-2, •First candidate #13: IP route #2 leading to the content server 400-3, •First candidate #14: IP route #1-b leading to the content server 400-3

Here, the following description is given on the assumption of an example in which "2" is set as a setting value.

Subsequently, the first measurement unit 123 measures delay time or a throughput related to a pattern, which is the first candidate, of the link aggregation (S46). For example, measurement is performed by using delay time or a throughout in accordance with implementation of the femtocell base station 100.

Here, details of a measurement example of delay time and a measurement example of a throughput are described.

<Measurement Example of Delay Time>

The first measurement unit 123 measures delay time of each pattern from the first candidate #21 to the first candidate #26. For example, the first measurement unit 123 measures delay time by using a ping command based on an internet content message protocol (ICMP) (or echo request notice (ICMP echo message)). The first measurement unit 123 transmits the echo request notice to the content servers 400-2 and 400-3 and receives an echo reply notice (ICMP echo reply message) with respect to the echo request notice from the content servers 400-2 and 400-3.

The first measurement unit 123 obtains round trip time (RTT) from transmission of the echo request notice to reception of the echo reply notice, for example, so as to measure delay time. When the first measurement unit 123 measures a plurality of IP routes, the first measurement unit 123 measures round trip time of a plurality of IP routes in parallel (or simultaneously). The first measurement unit 123 measures delay time of each of patterns, from the first candidate #21 to the first candidate #26, of the link aggregation, for example. The first measurement unit 123 outputs the measured delay time of each of the patterns to the content server selection unit 124.

Then, the content server selection unit 124 estimates a throughput of each pattern of the link aggregation on the basis of the measured delay time so as to select a pattern of the link aggregation of which a throughput is estimated to be highest (S47). The content server selection unit 124 estimates a throughput of each pattern by using the following formula.

$$\text{Estimated throughput [bps]} = \Sigma_{IP\ route}\{(\text{data size of ping [bit]} \times 2)/\text{round trip delay [s]}\} \quad (1)$$

For example, in the example of the first candidate #21, estimation throughputs of respective routes are calculated by formula (1) on the basis of the round trip delay of the IP route #1 and the IP route #2-b, and a throughput obtained by summing the estimation throughputs is an estimation throughput of the first candidate #21. Further, in the example of the first candidate #23, an estimation throughput calculated by formula (1) on the basis of round trip delay of the IP route #1 is an estimation throughput of the first candidate #23.

A throughput of the first candidate #23 which uses a single IP route may be higher than that of the first candidate #21 which uses a plurality of IP routes, depending on a state of a line which is used by each IP route. For example, in a case in which a physical line which is used by two IP routes in an overlapped manner is congested, a total throughput may be lower than a throughput of a single IP route due to the simultaneous use of the physical line by two routes.

The content server selection unit 124 estimates throughputs respectively from the first candidate #21 to the first candidate #26 by formula (1) and selects the first candidate (or a pattern of the link aggregation) of which a throughput is estimated to be the highest. For example, the content server selection unit 124 selects the first candidate #21 as a pattern of the link aggregation of which a throughput is estimated to be highest.

Subsequently, the content server selection unit 124 selects the content server 400-2 or 400-3 which is coupled with the femtocell base station 100 by the selected pattern of the link aggregation (S48). The content server selection unit 124 selects the content server 400-2 based on the first candidate #21, for example.

Estimation of a throughput based on delay time is not as precise as a throughput of a case in which a content is acquired by actually using the link aggregation. This is because processing time in the content servers 400-2 and 400-3 is not reflected to measurement of delay time and the maximum value of the data size of the ping command is smaller than other commands to be largely influenced by other communication traffics, for example.

<Measurement Example of Throughput>

A measurement example of a throughput is now described. In this case, the first measurement unit 123 actually acquires part of contents from the content servers 400-2 and 400-3 so as to measure a throughput in the acquisition.

For example, the first measurement unit 123 acquires several bytes from the head of a content which is specified by the URL through each IP route of patterns of the link aggregation from the content servers 400-2 and 400-3 by using the HTTP protocol. Then, the first measurement unit 123 divides the number of bytes of the acquired content by time used for the acquisition so as to measure a throughput [bps]. The number of bytes to be acquired may be set on the basis of a setting value, for example.

When the first measurement unit 123 measures a plurality of IP routes, the first measurement unit 123 measures throughputs of respective IP routes of a plurality of IP routes in parallel (or simultaneously). For example, the first measurement unit 123 measures a throughput of the IP route #1 and collaterally measures a throughput of the IP route #2-b, and a throughput obtained by adding these throughputs to each other is a throughput of the first candidate #21. The first measurement unit 123 measures throughputs of respective patterns of six candidates which are from the first candidate #21 to the first candidate #26, for example, of the link aggregation. The first measurement unit 123 outputs the measured throughputs of respective patterns to the content server selection unit 124.

Then, the content server selection unit 124 determines a pattern of the link aggregation in which it is estimated that the highest throughput is obtained, on the basis of the measured throughputs (S47). For example, the content server selection unit 124 selects the first candidate #21.

Subsequently, the content server selection unit 124 selects the content server 400-2 or 400-3 which is coupled by the determined pattern (S48). For example, the content server selection unit 124 selects the content server 400-2 based on the first candidate #21.

Estimation of a throughput based on delay time is not a precise as estimation of a throughput performed by acquiring contents. This is because processing time in the content servers 400-2 and 400-3 is not reflected to measurement of delay time and the maximum value of the data size of the ping command is smaller than other commands to be largely influenced by other communication traffics, for example.

On the other hand, estimation of a throughput performed by acquiring contents is more precise than estimation of a throughput performed on the basis of delay time, but measurement takes time because part of contents is actually acquired and thus the measurement imposes a load on the communication network system 10. Accordingly, whether estimation of a throughput performed on the basis of delay time or estimation of a throughput performed by partial-acquisition of contents is used may be determined on the basis of an implementation policy of the femtocell base station 100, for example.

When the content server selection unit 124 selects the content server 400-2 or 400-3, the content server selection unit 124 stores the selection result in the cache table 1241 (S49).

Then, the femtocell base station 100 ends the content server selection processing (S50).

Thus, in this communication network system 10, it is possible to select the content server 400-2 or 400-3 which constitutes a pattern, in which it is estimated that a higher throughput is obtained than other patterns, of the link aggregation between a plurality of content servers 400-2 and 400-3 (S26 of FIG. 7, S47 and S48 of FIG. 8, for example). Accordingly, in a case in which communication is performed by using the link aggregation, for example, the femtocell base station 100 is capable of selecting the content server 400-2 or 400-3 from which a higher throughput is obtained than another content server. Further, in this communication network system 10, it is possible to improve end-to-end throughputs between the terminal 500 and the content server 400-2 and between the terminal 500 and the content server 400-3, for example.

Third Embodiment

A third embodiment is now described. The third embodiment illustrates an example of selection of the content server 400-2 or 400-3 based on a throughput of wireless communication and a processing load of a femtocell base station, for example.

Figure 10:
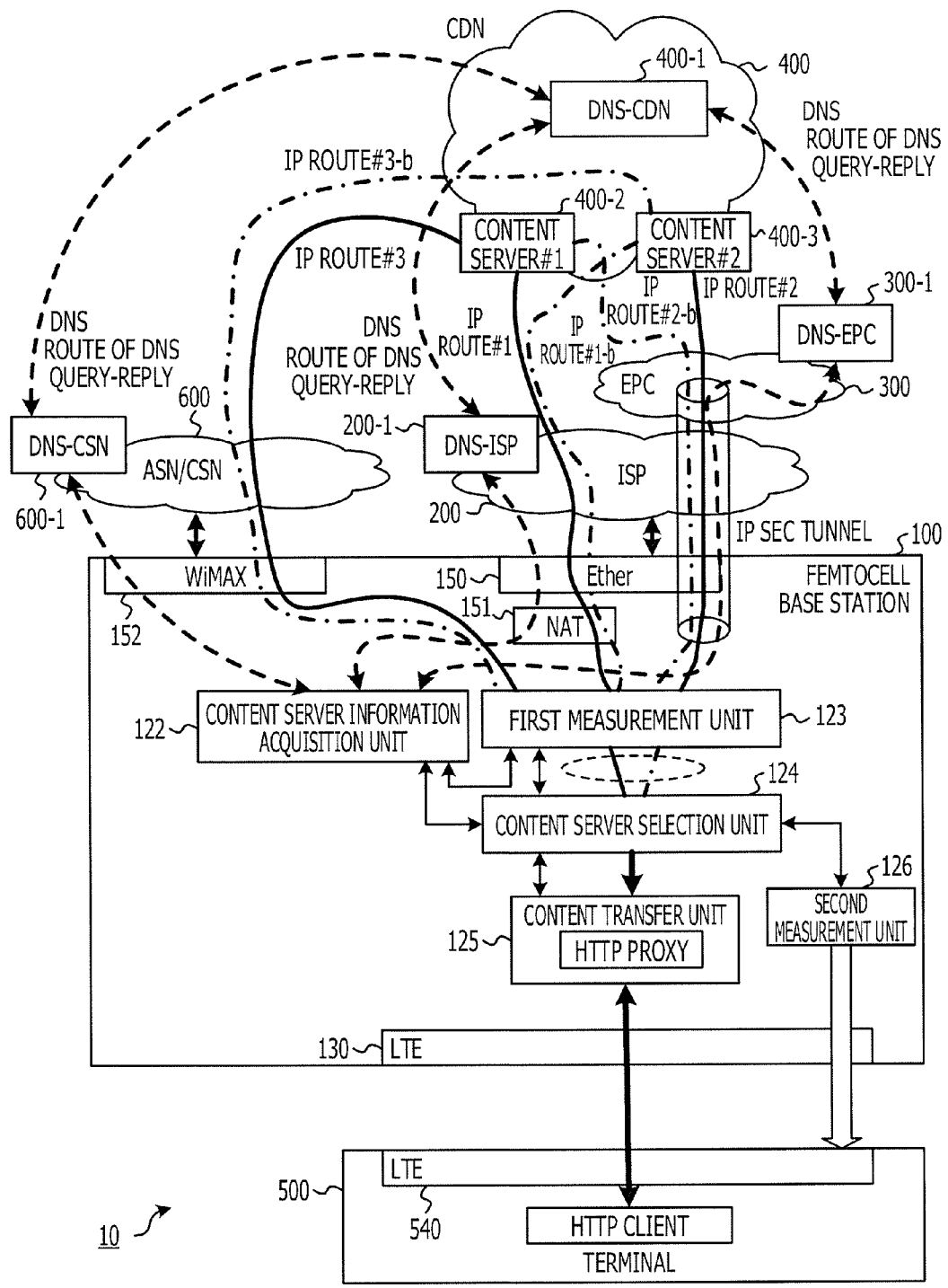
FIG. 10 illustrates a configuration example of a communication network system.
Figure 11:
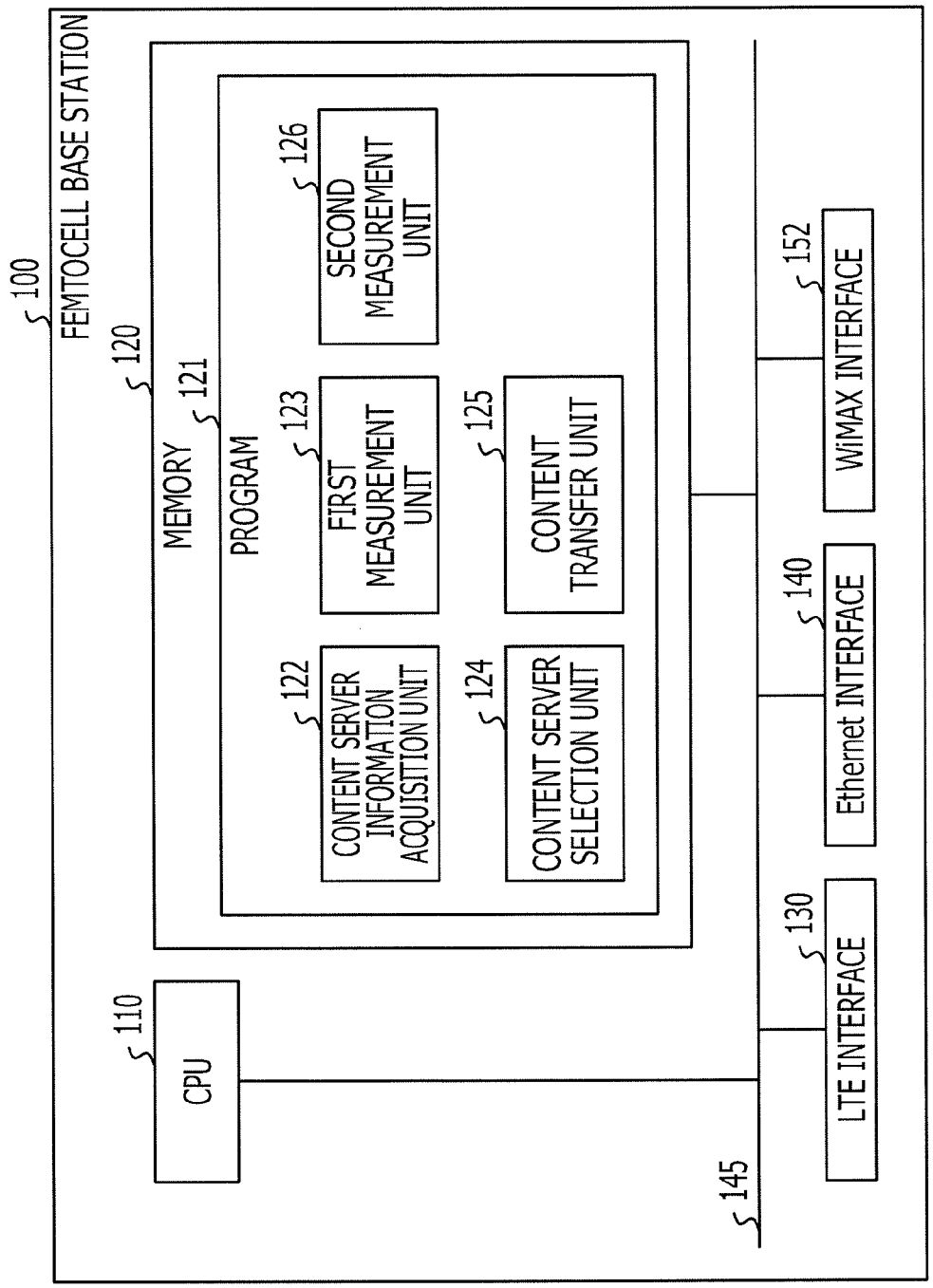
FIG. 11 illustrates a configuration example of a femtocell base station.
Figure 12A:
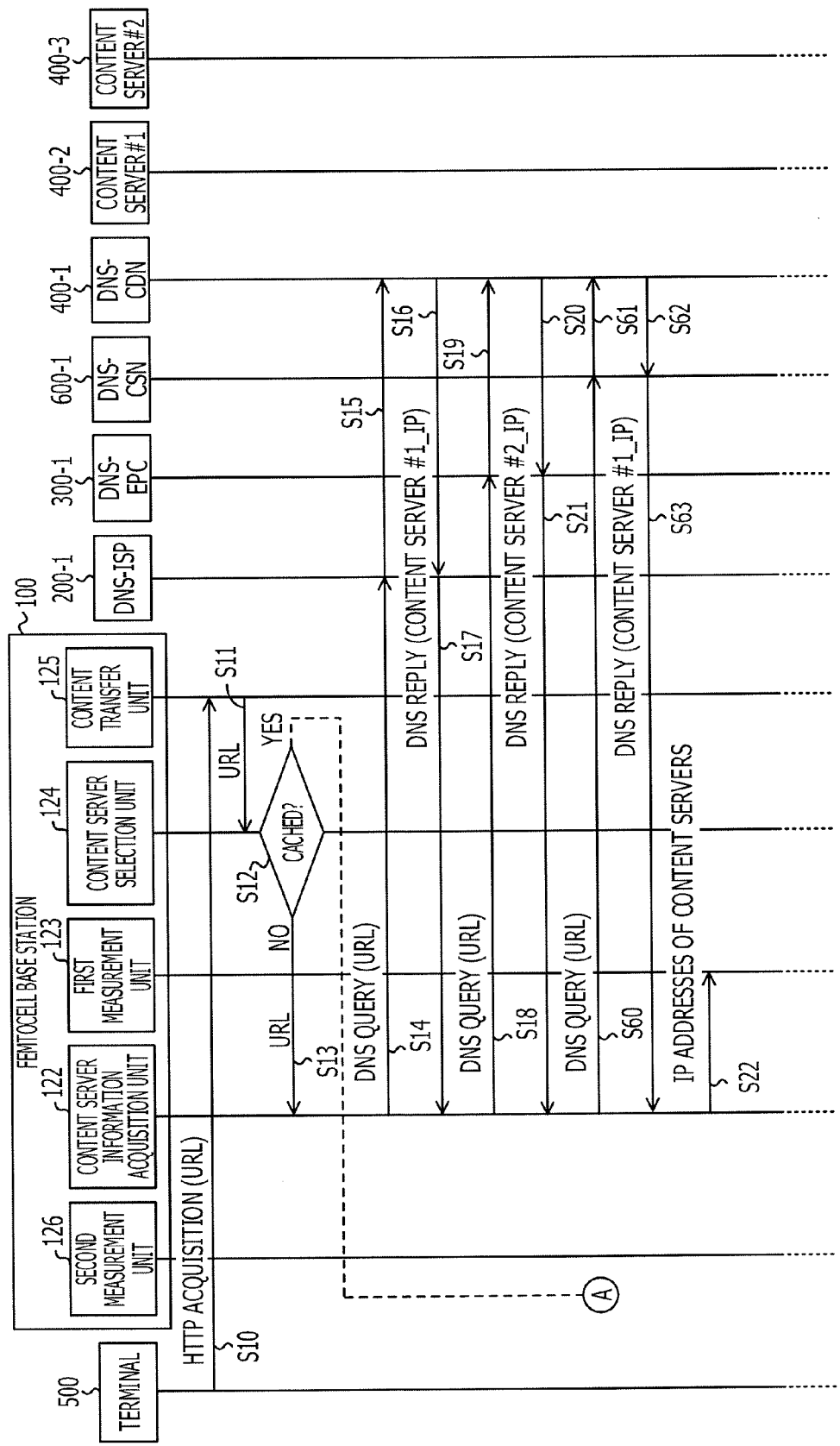
FIGS. 12A and 12B are sequence diagrams illustrating an operation example in the communication network system.
Figure 12B:
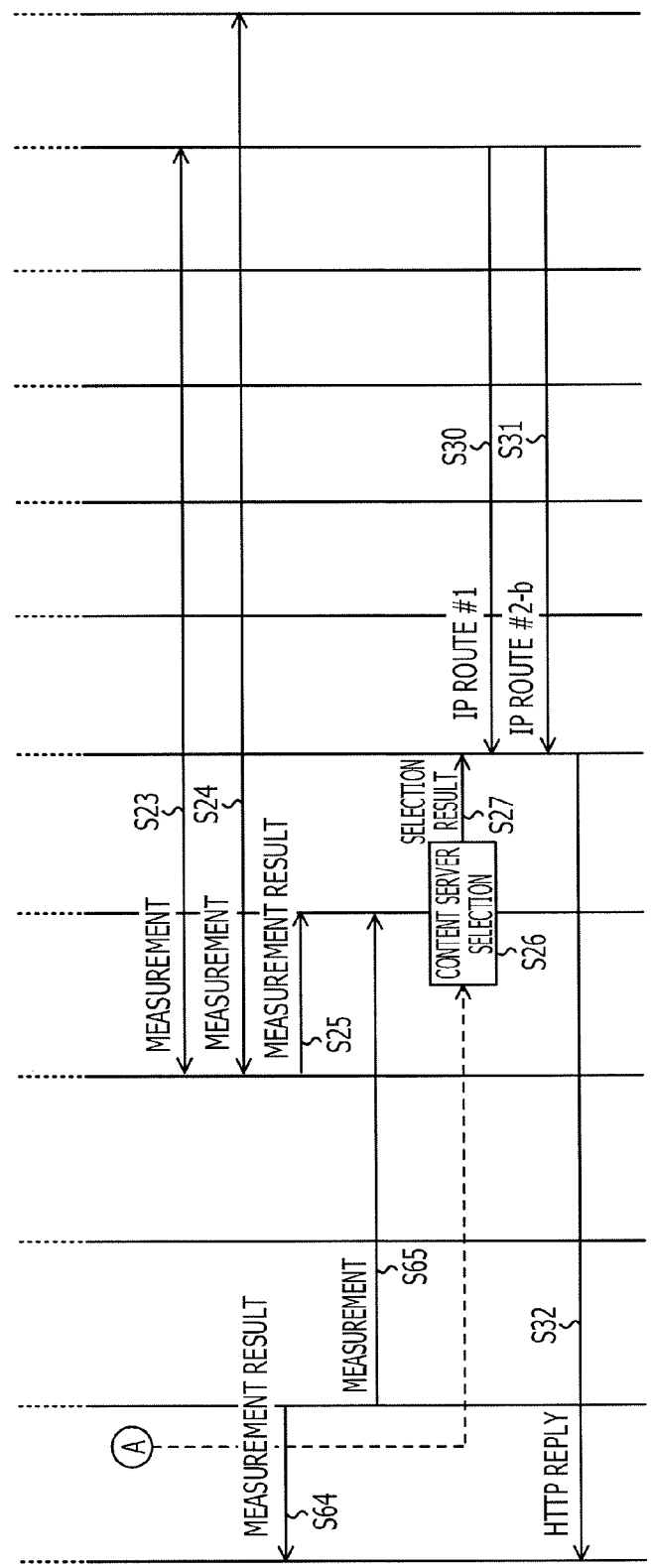
Figure 13:
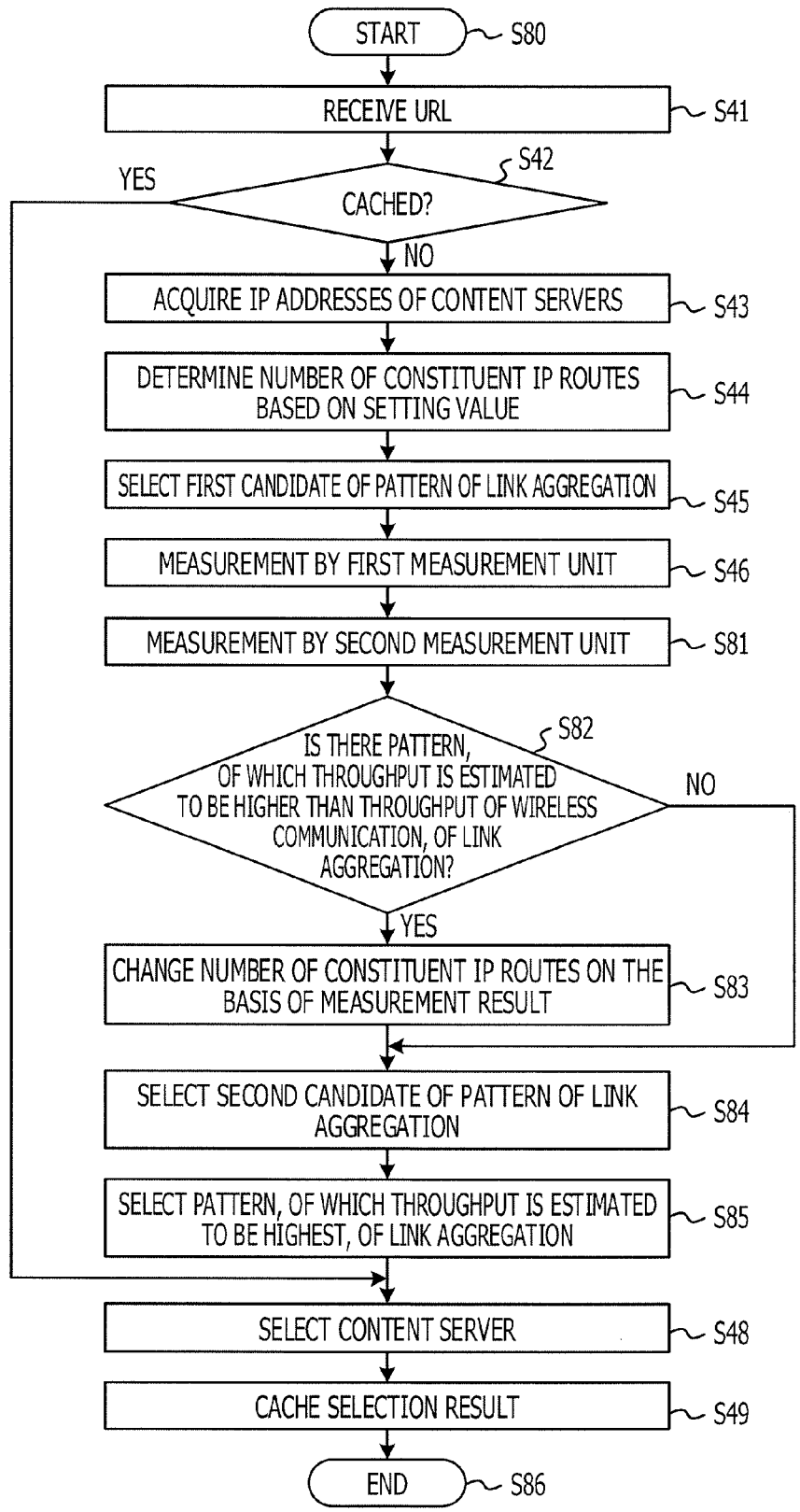
FIG. 13 is a flowchart illustrating an example of content server selection processing.

FIG. 10 illustrates a configuration example of a communication network system 10 according to the third embodiment, FIG. 11 illustrates a configuration example of a femtocell base station 100, FIGS. 12A and 12B illustrate a sequence example according to the third embodiment, and FIG. 13 is a flowchart illustrating an example of selection processing of the content server 400-2 or 400-3.

As illustrated in FIG. 10, the communication network system 10 further includes an access service network/connectivity service network (ASN/CSN) 600. The ASN/CSN 600 includes two networks which are an ASN which is a network of worldwide interoperability for microwave access (WiMAX) and a CSN corresponding to a higher-order core network of the ASN. Here, WiMAX is a type of a wireless communication method and has been standardized as IEEE802.16e by the institute of electrical and electronic engineers (IEEE) on 2005.

To the ASN/CSN 600, a DNS-CSN 600-1 is coupled. The DNS-CSN 600-1 is a DNS server in the ASN/CSN 600. When the DNS-CSN 600-1 receives a DNS query from the femtocell base station 100, the DNS-CSN 600-1 transmits the DNS query to the DNS-CDN 400-1. Further, when the DNS-CSN 600-1 receives a DNS reply with respect to the DNS query from the DNS-CDN 400-1, the DNS-CSN 600-1 transmits the DNS reply to a transmission source (for example, the femtocell base station 100) of the DNS query. Accordingly, the DNS-CSN 600-1 (or the femtocell base station 100) is capable of acquiring an IP address of the content server 400-2 or 400-3 which corresponds to a URL.

The femtocell base station 100 further includes a second measurement unit 126 and a WiMAX interface 152.

The second measurement unit 126 measures a throughput of wireless communication between the femtocell base station 100 and the terminal 500. Details of the measurement method will be described later. The second measurement unit 126 outputs a measurement result to the content server selection unit 124. The content server selection unit 124 selects the content server 400-2 or 400-3 on the basis of a measurement result obtained by the first measurement unit 123 and the measurement result obtained by the second measurement unit 126. Details of the selection method will be described later.

The WiMAX interface 152 generates an IP packet representing a DNS query on the basis of an instruction from the content server information acquisition unit 122, for example, so as to transmit the IP packet to the DNS-CSN 600-1. Further, when the WiMAX interface 152 receives a DNS reply from the DNS-CSN 600-1, the WiMAX interface 152 extracts IP addresses of the content servers 400-2 and 400-3 included in the DNS reply so as to output the IP addresses to the content server information acquisition unit 122.

In the third embodiment, two IP routes which are IP route #3 and IP route #3-b are further added and patterns of the link aggregation are increased along with the addition of the IP routes.

FIG. 11 illustrates a configuration example of hardware of the femtocell base station 100 in the third embodiment. The second measurement unit 126 is further added to the program 121 and the WiMAX interface 152 is coupled with other blocks via the bus 145. For example, the CPU 110 reads and executes the program 121 so as to realize a function performed in the second measurement unit 126. The second measurement unit 126 corresponds to the CPU 110, for example. The CPU 110 exchanges a signal and the like with the WiMAX interface 152 via the bus 145 so as to exchange an IP packet and the like with the ASN/CSN 600 which is coupled to the WiMAX interface 152, for example.

An operation example in this communication system 10 is now described with reference to FIGS. 12A and 12B. Here, parts of processing identical to that of the second embodiment are given the same reference characters in FIGS. 12A and 12B, and points different from the second embodiment are mainly described below.

When a URL of a DNS query object is not stored in the cache table 1241 (No in S12), the content server information acquisition unit 122 transmits a DNS query to the DNS-ISP 200-1, the DNS-EPC 300-1, and the DNS-CSN 600-1 (S14, S18, S60).

When the DNS-CSN 600-1 receives the DNS query from the femtocell base station 100, the DNS-CSN 600-1 transmits the DNS query to the DNS-CDN 400-1 (S61).

When the DNS-CDN 400-1 receives the DNS query which is transmitted from the DNS-CSN 600-1, the DNS-CDN 400-1 replies an IP address of the content server 400-2, for example, as a DNS reply to the DNS-CSN 600-1 (S62).

When the DNS-CSN 600-1 receives the DNS reply which is transmitted from the DNS-CDN 400-1, the DNS-CSN 600-1 transmits the DNS reply to the femtocell base station 100 (S63). The content server information acquisition unit 122 receives the DNS reply and acquires the IP address of the content server 400-2.

The content server information acquisition unit 122 outputs the acquired IP address of the content server 400-2 or 400-3 to the first measurement unit 123 (S22).

The first measurement unit 123 measures delay time or a throughput related to an IP route leading to the content server 400-2 (S23). Further, the first measurement unit 123 measures delay time or a throughput related to an IP route leading to the content server 400-3 (S24). As IP routes which are measurement objects, the IP route #3 leading to the content server 400-2 and the IP route #3-b leading to the content server 400-3 are added. The measurement is same as that of the second embodiment, for example. The first measurement unit 123 outputs a measurement result to the content server selection unit 124.

Meanwhile, the second measurement unit 126 measures a throughput of wireless communication between the femtocell base station 100 and the terminal 500 (S64). Details of the measurement method will be described later. The second measurement unit 126 outputs a measurement result to the content server selection unit 124 (S65).

The content server selection unit 124 selects the content server 400-2 or 400-3 which is coupled with the femtocell base station 100 by a pattern in which it is estimated that the highest throughput is obtained among patterns of the link aggregation, on the basis of the measurement result from the first measurement unit 123 (S25) and the measurement result from the second measurement unit 126 (S65). Details of the selection method will be described later.

Here, in this operation example, description is given on the assumption that the content server selection unit 124 selects the content server 400-2 which is coupled by a pattern of the link aggregation in which the IP route #1 and the IP route #2-b are simultaneously used. The content server selection unit 124 transfers a selection result to the content transfer unit 125 (S27). The following operation is same as that of the second embodiment, so that description thereof is omitted.

FIG. 13 is a flowchart illustrating an example of content server selection processing. Details of the measurement method in the first measurement unit 123 and the second measurement unit 126, details of the content server selection processing in the content server selection unit 124, and the like are described with reference to FIG. 13. Parts of processing, which is identical to that of the second embodiment (for example, FIG. 8), of the flowchart of FIG. 13 are also given the same reference characters and description thereof is arbitrarily omitted.

When the first measurement unit 123 receives IP addresses of the content servers 400-2 and 400-3 (S43), the first measurement unit 123 determines the number of constituent IP routes on the basis of a setting value which is set as a specification of the femtocell base station 100, for example (S44). For example, the first measurement unit 123 determines "3" as the number of constituent IP routes.

Subsequently, the first measurement unit 123 examines patterns of the link aggregation so as to select the first candidate of a pattern of the link aggregation (S45). In the example of the network configuration of FIG. 10, when the number of constituent IP routes is "3", the following patters are selected as the first candidate. •First candidate #331: IP route #1+IP route #2-b+IP route #3 leading to the content server 400-2, •First candidate #332: IP route #2+IP route #1-b+IP route #3-b leading to the content server 400-3, •First candidate #321: IP route #1+IP route #2-b leading to the content server 400-2, •First candidate #323: IP route #1+IP route #3 leading to the content server 400-2, •First candidate #324: IP route #2-b+IP route #3 leading to the content server 400-2, •First candidate #325: IP route #2+IP route #1-b leading to the content server 400-3, •First candidate #326: IP route #2+IP route #3-b leading to the content server 400-3, •First candidate #328: IP route #1-b+IP route #3-b leading to the content server 400-3, •First candidate #311: IP route #1 leading to the content server 400-2, •First candidate #312: IP route #2-b leading to the content server 400-2, •First candidate #313: IP route #3 leading to the content server 400-2, •First candidate #314: IP route #2 leading to the content server 400-3, •First candidate #315: IP route #1-b leading to the content server 400-3, •First candidate #316: IP route #3-b leading to the content server 400-3

Subsequently, the first measurement unit 123 measures delay time or a throughput related to each pattern of the link aggregation of the first candidates (S46). Measurement of delay time and a throughput is performed in the same manner as that of the second embodiment. Whether delay time or a throughput is used depends on implementation of the femtocell base station 100, for example.

Subsequently, the second measurement unit 126 measures a throughput of wireless communication between the femtocell base station 100 and the terminal 500 (S81). A throughput of wireless communication is measured as follows, for example.

Namely, the second measurement unit 126 may estimate a throughput on the basis of delay time as is the case with the second embodiment. Specifically, the second measurement unit 126 performs estimation by using formula (1), for example.

Alternatively, the second measurement unit 126 may actually acquire data from the terminal 500 to measure a throughput in the acquisition, as is the case with the second embodiment. Specifically, the second measurement unit 126 may acquire data (several bytes from the head, for example) from the terminal 500 and divide the number of bytes of the acquired data by time used for the acquisition so as to measure a throughput [bps].

Further, the second measurement unit 126 may measure a throughput on the basis of a modulation and coding scheme (MCS). The MCS is a combination of a modulation system of wireless communication between the femtocell base station 100 and the terminal 500 and a coding rate, for example, and is determined in assignment of a wireless resource on the basis of radio quality such as a signal to interference ratio (SIR). As a multivalued level of the modulation system is higher and further, a coding rate is higher, a throughput becomes higher. A pattern of a combination between a modulation system and a coding rate is determined as a standard specification of LTE and a pattern is determined also in a standard specification of a wireless local area network (LAN) which is different from the LTE, though. The second measurement unit 126 may measure a throughput in accordance with a combination between a modulation system and a coding rate which are determined in assignment of a wireless resource, for example.

Then, the content server selection unit 124 determines whether or not there is a pattern of the link aggregation in which it is estimated that a throughput higher than a throughput of wireless communication between the femtocell base station 100 and the terminal 500 is obtained, on the basis of two measurement results (S82). That is, the content server selection unit 124 compares a throughput of wireless communication obtained by the second measurement unit 126 with each throughput from the first candidate #331 to the first candidate #316 obtained by the first measurement unit 123 so as to determine whether or not there is a first candidate of which a throughput is higher than the throughput of wireless communication.

When there is no pattern of the first candidate of which a throughput is higher than the throughput of wireless communication (No in S82), the content server selection unit 124 directly sets a pattern of the first candidate as a pattern of the second candidate (S84).

Subsequently, the content server selection unit 124 selects a pattern of the link aggregation in which it is estimated that the highest throughput is obtained, for a pattern of the second candidate (S85).

Accordingly, when there is no pattern of the link aggregation in which it is assumed that a throughput higher than the throughput of wireless communication between the femtocell base station 100 and the terminal 500 is obtained (No in S82), a pattern of the link aggregation is selected irrespective of a processing load in the femtocell base station 100.

That is, an end-to-end throughput between the terminal 500 and the content server 400-2 and between the terminal 500 and the content server 400-3 is a throughput which is realized by a selected pattern of the link aggregation. When the number of constituent IP routes is larger than a predetermined threshold value, a processing load of the femtocell base station 100 is also increased. However, in this case, a pattern of the link aggregation which is selected by the content server selection unit 124 exhibits the best end-to-end throughput realizable between the terminal 500 and the content server 400-2, so that it may be said that favorable selection has been performed.

On the other hand, when there is the first candidate in which it is estimated that a throughput higher than the throughput of wireless communication is obtained (Yes in S82), the content server selection unit 124 changes the number of constituent IP routes on the basis of a measurement result (S83).

For example, a case in which the following results are obtained as measurement results of a throughput is considered. 1. First candidate #331: IP route #1+IP route #2-b+IP route #3 leading to the content server 400-2, 2. First candidate #332: IP route #2+IP route #1-b+IP route #3-b leading to the content server 400-3, 3. First candidate #321: IP route #1+IP route #2-b leading to the content server 400-2, 4. First candidate #323: IP route #1+IP route #3 leading to the content server 400-2, 5. First candidate #324: IP route #2-b+IP route #3 leading to the content server 400-2, 6. First candidate #325: IP route #2+IP route #1-b leading to the content server 400-3, 7. Wireless communication between the femtocell base station and the terminal, 8. First candidate #326: IP route #2+IP route #3-b leading to the content server 400-3, 9. First candidate #328: IP route #1-b+IP route #3-b leading to the content server 400-3, 10. First candidate #311: IP route #1 leading to the content server 400-2, 11. First candidate #312: IP route #2-b leading to the content server 400-2, 12. First candidate #313: IP route #3 leading to the content server 400-2, 13. First candidate #314: IP route #2 leading to the content server 400-3, 14. First candidate #315: IP route #1-b leading to the content server 400-3, 15. First candidate #316: IP route #3-b leading to the content server 400-3

In the above measurement results, numbers on the left side represent rank orders in a descending order of throughputs, in which "1" represents the highest throughput and "15" represents the lowest throughput. A throughput of wireless communication between the femtocell base station 100 and the terminal 500 represents the "seventh" throughput among patterns of the first candidates.

First candidates in which it is estimated a throughput higher than the throughput of wireless communication between the femtocell base station 100 and the terminal 500 is obtained are six candidates which are from the first candidate #331 to the first candidate #325. Among these six patterns from the first candidate #331 to the first candidate #325, the number of IP routes in a pattern using the smallest number of IP routes is "2". In this case, the content server selection unit 124 changes the number of constituent IP routes which is determined in S44 from "3" to "2".

Subsequently, the content server selection unit 124 selects a pattern of the link aggregation which is constituted by the changed number of constituent IP routes as the second candidate among the first candidates (S84). In the example of the above measurement results, the content server selection unit 124 sets six patterns from the first candidate #321 to the first candidate #328 as the second candidates (from second candidate #321 to second candidate #328).

Then, the content server selection unit 124 selects a pattern of the second candidate in which it is estimated that the highest throughput is obtained among the second candidates of patterns of the link aggregation (S85). In the example of the above measurement results, the content server selection unit 124 selects the second candidate #321.

An end-to-end throughput between the terminal 500 and the content server 400-2 and between the terminal 500 and the content server 400-3 depends on a throughput of wireless communication between the femtocell base station 100 and the terminal 500. For example, even if a pattern of the link aggregation in which it is estimated that a throughput between the femtocell base station 100 and the content server 400-2 and between the femtocell base station 100 and the content server 400-3 is highest is selected, an end-to-end throughput does not become to be about a throughput of a wired zone when a throughput of wireless communication is lower than the throughput between the femtocell base station 100 and the content server 400-2 and between the femtocell base station 100 and the content server 400-3.

On the other hand, as the number of IP routes constituting a pattern of the link aggregation is smaller, a load of the femtocell base station 100 is decreased. In the example of the above measurement results, a processing load of the femtocell base station 100 is more decreased in a case in which the number of IP routes is "2" than a case in which the number of IP routes is "3".

An end-to-end throughput depends on a throughput of wireless communication. Therefore, at least when any pattern of the link aggregation which exhibits a throughput higher than the throughput of wireless communication is selected, patterns of the link aggregation in which the number of constituent IP routes is "2" and a processing load of the femtocell base station 100 is not equally high are equally favorable for a throughput and a processing load.

However, a throughput of wireless communication may vary depending on a wireless environment or the like, and a throughput may become higher than a measurement result measured by the second measurement unit 126, for example. Given that a throughput of wireless communication fluctuates to be increased depending on a wireless environment or the like, it is most favorable to select a pattern of which a throughput is estimated to be highest among patterns of the link aggregation in which a processing load of the femtocell base station 100 is not equally high.

Accordingly, the content server selection unit 124 selects a pattern in which it is estimated that a throughput in a wired zone is higher among constituent IP routes in which a processing load of the femtocell base station 100 is not high, for example, in the light of a processing performance of the femtocell base station 100. For example, in the example of the above-mentioned measurement results, the number of IP routes in which a processing load of the femtocell base station 100 does not become high is set as "2" (S83) and the second candidate #321 exhibiting the highest throughput among the patterns of the number of IP routes "2" is selected (S85).

Accordingly, it is possible to select a pattern exhibiting a higher throughput among patterns of the link aggregation in which a processing load of the femtocell base station 100 does not become high, for example. A throughput of wireless communication may vary as described above and a throughput equivalent to that in a wired zone may be obtained. Accordingly, such selection enables improvement of an end-to-end throughput between the terminal 500 and the content server 400-2 and between the terminal 500 and the content server 400-3.

Here, the content server selection unit 124 may also select a pattern in which the number of IP routes is "3" such as the second candidate #331 and the second candidate #332 as a pattern of the link aggregation in which it is estimated that the highest throughput is obtained, for example. However, in this case, a processing load of the femtocell base station 100 is increased compared to a pattern in which the number of IP routes is "2" such as the second candidate #321. Further, an end-to-end throughput between the terminal 500 and the content server 400-2 and between the terminal 500 and the content server 400-3 may become a throughput of wireless communication and become lower than a throughput in a wired zone, for example. Accordingly, such selection may not bring improvement of an end-to-end throughput.

Subsequently, the content server selection unit 124 selects the content server 400-2 or 400-3 which is coupled by a pattern of the link aggregation in which a throughput is estimated to be highest (S48). For example, the content server selection unit 124 selects the content server 400-2 based on the IP route #1 and the IP route #2-b (the second candidate #321).

Thus, in the third embodiment, it is possible to select the content server 400-2 or 400-3 based on a pattern in which a processing load of the femtocell base station 100 is lower, among patterns of the link aggregation in which a throughput equivalent to a throughput of wireless communication is obtained.

Here, in the third embodiment, the content server selection unit 124 changes the number of constituent IP routes from "3" to "2". However, when a throughput of wireless communication is lower than the above-described example, the content server selection unit 124 may change the number of constituent IP routes to "1". In this case, the content server selection unit 124 selects a pattern of the link aggregation which is constituted by a single route. In such selection, a throughput between the terminal 500 and the content server 400-2 and between the terminal 500 and the content server 400-3 is a throughput which is realized by wireless communication as a result. Accordingly, it may be said that favorable selection in which a processing load of the femtocell base station 100 is lower than the above-mentioned example is performed.

Other Embodiments

In the second and third embodiments, the femtocell base station 100 has been described as an example of a communication device. For example, a macro base station is also capable of executing what has been described in the second and third embodiments instead of the femtocell base station 100. In this case, the macro base station may be coupled to a network other than the ISP 200, for example, and it is sufficient that the macro base station is coupled with the content servers 400-2 and 400-3 via any network. Further, a device, other than the base station, such as gateway and a router which is disposed between a base station and the content server 400-2 and between the base station and the content server 400-3 may be employed as a communication device. In this case, the content server information acquisition unit 122, the first measurement unit 123, and the content server selection unit 124 may be provided to this device, for example.

Further, in description of the examples of the second and third embodiments, the number of content servers is two as the content servers 400-2 and 400-3. For example, the number of content servers which are coupled with the femtocell base station 100 may be three or more. The femtocell base station 100 estimates a throughput of an IP route leading to each content server, selects a pattern of the link aggregation exhibiting the highest throughput, and selects the content server 400-2 or 400-3, being able to execute processing in the same manner as the second and third embodiments.

In this application, for example, "connected to" is able to be replaced with "coupled to". Moreover, for example, when an element is referred to as being "connected to" or "coupled to" another element, it can be directly connected or coupled to the other element or intervening elements may be present. So do "connecting to", "coupling to", "connection to", "coupling to" and so on.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station, comprising:
a first communication hardware interface configured to communicate with a first content server and a second content server, the first content server and the second content server being configured to deliver a content;
a second communication hardware interface configured to communicate with a terminal device; and
a processor coupled to the first communication hardware interface and the second communication hardware interface configured to:
estimate each of a plurality of first throughputs for each of a plurality of first route patterns, each of a plurality of first route patterns corresponding to each of combinations of a plurality of first routes used in parallel, the plurality of first routes coupling the base station to the first content server respectively,
estimate each of a plurality of second throughputs for each of a plurality of second route patterns, each of a plurality of second route patterns corresponding to each of combinations of a plurality of second routes used in parallel, the plurality of second routes coupling the base station to the second content server respectively,
estimate a third throughput between the base station and the terminal device, by comparing the plurality of first throughputs and the plurality of second throughputs with the third throughput, select a plurality of third route patterns from the plurality of first route patterns and the plurality of second route patterns, select a fourth route pattern from the plurality of third route patterns based on number of the routes included in the fourth route pattern, acquire the content from the first content server or the second content server using the fourth route pattern, and transmit the content to the terminal device.

2. The base station according to claim 1, wherein the hardware processor is further configured to:

measure each of delay times from a transmission of first data from the base station to the first and second content servers to a reception of second data corresponding to the first data from the first and second content servers, for each of the plurality of the first and second route patterns, and select the plurality of third route patterns from the plurality of first route patterns and the plurality of second route patterns based on the measured delay times.

3. The base station according to claim 1, wherein the throughputs of the plurality of third route patterns are higher than the third throughput.

4. The base station according to claim 1, wherein the number of routs included in the fourth route pattern is equal to or less than the number of routs included in other route pattern of the third route patterns.

5. The base station according to claim 1, wherein the base station communicates with the first content server using the plurality of the first routes in link aggregation, and the base station communicates with the second content server using the plurality of the second routes in link aggregation.

6. The base station according to claim 1, wherein the hardware processor is a CPU.

7. A communication system, comprising:

a first content server;

a second content server, the first content server and the second content server being configured to deliver a content;

a terminal device; and a base station including a first communication hardware interface configured to communicate with the first content server and the second content server, a second communication hardware interface configured to communicate with the terminal device, and a processor coupled to the first communication hardware interface and the second communication hardware interface configured to:

estimate each of a plurality of first throughputs for each of a plurality of first route patterns, each of a plurality of first route patterns corresponding to each of combinations of a plurality of first routes used in parallel, the plurality of first routes coupling the base station to the first content server respectively, estimate each of a plurality of second throughputs for each of a plurality of second route patterns, each of a plurality of second route patterns corresponding to each of combinations of a plurality of second routes used in parallel, the plurality of second routes coupling the base station to the second content server respectively, estimate a third throughput between the base station and the terminal device, by comparing the plurality of first throughputs and the plurality of second throughputs with the third throughput, select a plurality of third route patterns from the plurality of first route patterns and the plurality of second route patterns, select a fourth route pattern from the plurality of third route patterns based on number of the routes included in the fourth route pattern, acquire the content from the first content server or the second content server using the fourth route pattern, and transmit the content to the terminal device.

8. A communication method performed by a base station communication device, the communication method comprising:

communicating with a first content server and a second content server, the first content server and the second content server being configured to deliver an a content;

communicating with a terminal device;

estimating each of a plurality of first throughputs for each of a plurality of first route patterns, each of a plurality of first route patterns corresponding to each of combinations of a plurality of first routes used in parallel, the plurality of first routes coupling the base station to the first content server respectively;

estimating each of a plurality of second throughputs for each of a plurality of second route patterns, each of a plurality of second route patterns corresponding to each of combinations of a plurality of second routes used in parallel, the plurality of second routes coupling the base station to the second content server respectively;

estimating a third throughput between the base station and the terminal device, by comparing the plurality of first throughputs and the plurality of second throughputs with the third throughput, selecting a plurality of third route patterns from the plurality of first route patterns and the plurality of second route patterns, selecting a fourth route pattern from the plurality of third route patterns based on number of the routes included in the fourth route pattern;

acquiring the content from the first content server or the second content server using the fourth route pattern; and transmitting the content to the terminal device.

* * * * *